(12) United States Patent
Papadakis et al.

(10) Patent No.: US 7,689,056 B2
(45) Date of Patent: Mar. 30, 2010

(54) FRAME MULTI-RESOLUTION ANALYSIS IN ANY NUMBER OF DIMENSIONS

(75) Inventors: Emmanouil I. Papadakis, Houston, TX (US); Donald J. Kouri, Houston, TX (US); David K. Hoffman, Ames, IA (US); Ioannis A Kakadiaris, Bellaire, TX (US); Grigoriy Gogoshin, Houston, TX (US)

(73) Assignee: The University of Houston System, Houston, TX (US)

( * ) Notice: Subject to any disclaimer, the term of this patent is extended or adjusted under 35 U.S.C. 154(b) by 1277 days.

(21) Appl. No.: 10/800,145

(22) Filed: Mar. 12, 2004

(65) Prior Publication Data

US 2005/0027770 A1 Feb. 3, 2005

Related U.S. Application Data

(60) Provisional application No. 60/453,889, filed on Mar. 12, 2003.

(51) Int. Cl.
*G06K 9/40* (2006.01)
(52) U.S. Cl. ..................................... 382/260
(58) Field of Classification Search ..................... None
See application file for complete search history.

(56) References Cited

U.S. PATENT DOCUMENTS 5,898,798 A * 4/1999 Bouchard et al. ........... 382/242

OTHER PUBLICATIONS

"Non-separable Radial Frame Multiresolution Analysis in Multidimensions and Isotropic Fast Wavelet Algorithms" by Papadakis et al. SPIE Proceedings, "Wavelets X" Aldroubi, A. Laine, M. Unser (Eds.), 2003.*
"A Kind of 2-D Isotropic Wavelet for Detecting Image Primitives" by Hou et al., Circuits and Systems, 2000. IEEE APCCAS 2000. The 2000 IEEE Asia-Pacific Conference on Dec. 4-6, 2000 pp. 731-735.*
"Periodic shift-invariant multiresolution analysis" by Bastys, IEEE Digital Signal Processing Workshop, 1996, pp. 398-400.*

* cited by examiner

*Primary Examiner*—Charles Kim
(74) *Attorney, Agent, or Firm*—Robert W Strozier

(57) ABSTRACT

A non-separable multiresolution structure based on frames by radial scaling functions is disclosed, which are minimally supported in the frequency. Resulting frame multiwavelets are also disclosed which can be isotropic. The construction can be carried out in any number of dimensions and for a variety of dilation matrices.

24 Claims, 10 Drawing Sheets

FRAME MULTI-RESOLUTION ANALYSIS IN ANY NUMBER OF DIMENSIONS

RELATED APPLICATIONS

This application claims provisional priority to U.S. Provisional Patent Application Ser. No. 60/453,889 filed 12 Mar. 2003.

GOVERNMENTAL INTEREST

Subject matter disclosed herein was supported in part through the following Governmental grants: NSF-DMS 0070376, NSF Career Award CISE-9985482, NSF-CHE-0074311, and is therefore subject to certain Governmental rights and interests.

BACKGROUND OF THE INVENTION

1. Field of the Invention

The present invention relates to the general field of digital signal processing.

More particularly, the present invention relates to multi-resolution analysis for signals or data of any dimensionality using a non-separable, radial frame, multi-resolution analysis in multidimensions.

2. Description of the Related Art

Digital signal processing, and, in general, the manipulation of information of all types by digitization, is at the heart of the computer-based approach to a vast range of problems in science, engineering, technology, modern economics modeling, data storage and retrieval, etc. There exist many robust approaches for problems which are intrinsically one-dimensional, and the theory of how one systematically parses the information content into small, manageable "chunks" is well developed. The essential idea is that information can be characterized either in a "physical" or "measurement" domain which, for example, we take to be the "time domain", or in a complementary, mathematical domain referred to as the "Fourier domain" (which we shall refer to as the frequency domain). It is most useful if there are natural limitations on how much information in the measurement or time domain is required to characterize a given amount of information in the frequency domain.

In one-dimension (1-D), the best possible situation is when, e.g., only a finite range or "band" of data in the frequency domain is needed to characterize completely the underlying mathematical behavior. Such a situation is said to be "band-limited" and if one can capture, without any loss, all the frequency components contained in the band, the signal or phenomenon is exactly captured. Further, if the signal becomes "contaminated" by extraneous signals with frequencies outside the band range, then these can be eliminated by sending the signal through a "filter" that strains out everything except frequencies in the physical band range. This is accomplished mathematically simply by multiplying the signal (plus noise) by a function that is 1 for frequencies within the band-limit and 0 for all other frequencies. Such a filter is fundamental in all areas of signal processing and information analysis, and it is called "ideal filter" of "ideal window".

The amazing fact is that when one must treat signals that are of higher dimension including the simplest case of (two dimensional (2-D) data), the only rigorous way that exists to create such an ideal window (and to shift or translate them to different frequency bands can be captured leading to a multiresolution) is by multiplying 1-D ideal windows for each degree of freedom. Such products are said to be "separable" and they are inefficient for studying data sets or signals for which there is not a natural separation of information content along orthogonal directions. It is expected that in the absence of knowledge of such a directional bias in the signal, the best approach would treat the data in the most isotropic manner possible.

Thus, there is a need in the art of signal processing for the construction of improved multi-resolution analysis techniques for extracting information from complex scientific signals, especially processing techniques that involve non-separable, radial frame, multi-resolution analysis in one or more dimensions.

SUMMARY OF THE INVENTION

The present invention provides a signal processing technique using a completely isotropic ideal filter, and then translating and dilating the filter to create a multiresolution analysis. The technique includes the following constructed components: 1) isotropic ideal windows or filters in any number of dimensions; 2) translations and dilations to create completely isotropic low pass filters, high pass filters and/or filters that cover all frequencies and/or frequency ranges important to any appropriate signal processing problem; 3) isotropic scaling functions with translations of the low pass scaling function; and 4) associated wavelets that can be used to resolve a multidimensional signal into various resolution levels, where the technique admits as many levels of multi-resolution as desired, so that the high pass components can be further parsed into their own "relative low pass" and "relative high pass" components.

The present invention provides scaling functions, wavelets and various isotropic non-separable ideal windows or filters that are the components needed to construct completely isotropic, intrinsically non-separable low pass and high pass filters, scaling functions, and wavelets that also have the optimum localization of information in a time-frequency description.

The present invention provides an improved method to analyze signals, data, information, images as well as other items of any number of dimensions, both in terms of efficiency and complexity of problems that can be addressed. The present technique can be used to analysis: (a) data compression and storage for streaming video, seismic imaging, digital medical imaging of all types, etc.; (b) image and signal enhancement, denoising and analysis for medical imaging, seismic imaging, satellite imaging and surveillance, target acquisition, radar, sonar, pattern recognition and analysis, etc.; (c) volume rendering and segmentation, motion analysis, etc.; and (d) as a basis for digital algorithms for solving ordinary and partial differential equations in science, engineering, economics, and other disciplines.

The present invention further relates to a computer or computer readable storage medium having implemented thereon software corresponding to the signal processing techniques of this invention.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
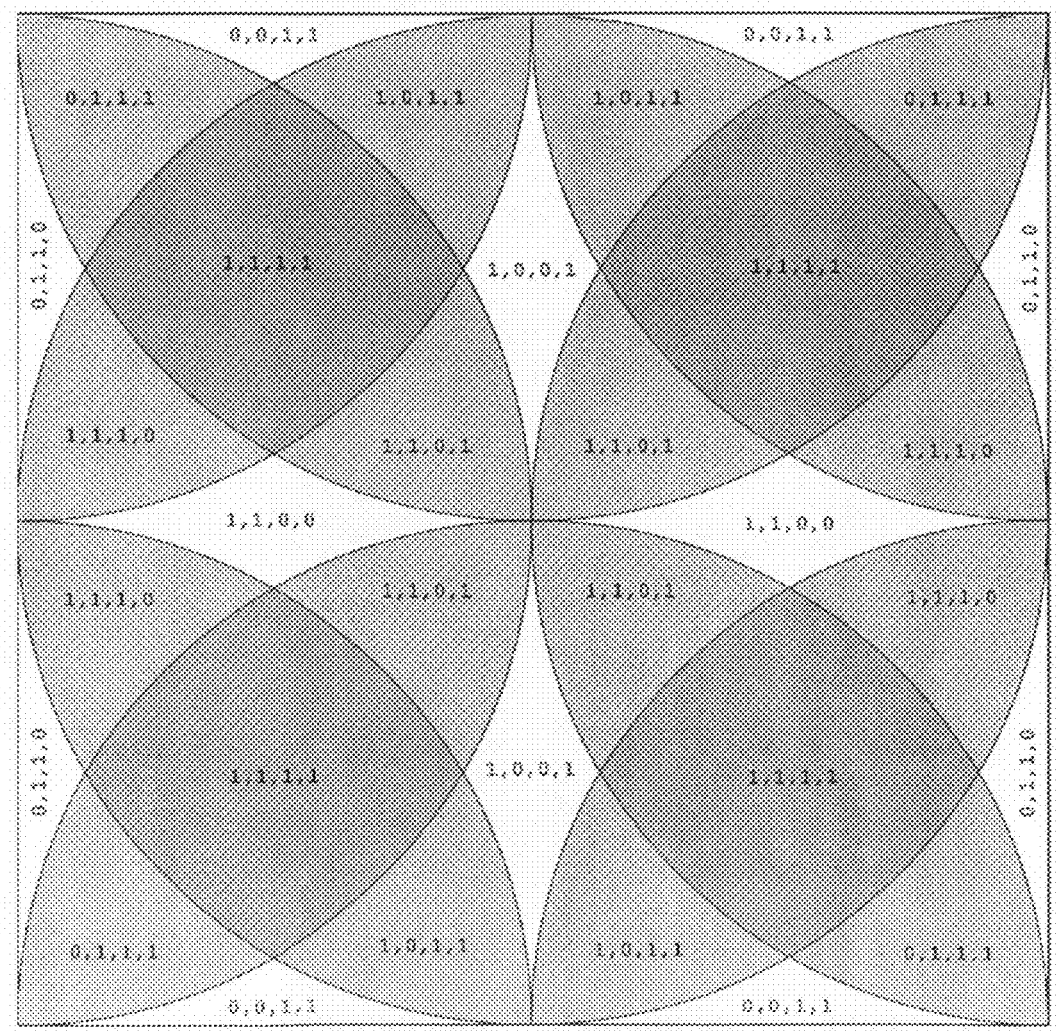
FIG. 1 depicts a plot of each of the sets of $D+k_r$.

The inventors have found that a new class of frame multi-resolution analysis can be used to construct ideal filters. There are no other such totally isotropic, multidimensional, and non-separable scaling and wavelet functions and low and high pass filters currently in existence. The present invention is unique. The first tests of the invention are directed to two dimensional (2D) images and data sets.

If one could pass a signal through a set of ideal, isotropic windows or filters, each window passing a different band of frequencies, this would decompose the signal into subsets of information—we say the signal is resolved into a number of non-overlapping subsets and this is the basic idea behind "multiresolution analysis" of signals or digital information.

We construct the new frame multiresolution analysis in any desired number of dimensions, whose core subspace is defined by the integer translations of a finite set of frame scaling functions, which have minimal support in the frequency domain. (The Fourier transform of the time domain scaling function is the characteristic function on a specific frequency range.)

The most apparent representative classes of prototypes filters are a Frame multi-resolutions defined by a single scaling frame function, whose Fourier transform is a characteristic or "indicator" function of a hyper sphere (i.e., a disk in two dimensions (2D), a sphere in three dimensions (3D), hypersphere in higher dimensions (nD)), centered at the origin of the coordinate system having radius ½ (so that 0<R<½). Since this scaling function has this form in the frequency domain, its associated low pass filter in the frequency domain will also be such a characteristic hypersphere (or "ball") D/2 with radius ¼. A fundamental property of the obtained wavelets and filters is that they are the first ever, truly intrinsically non-separable wavelets and filters that can be realized in any number of dimensions.

Additionally, the Fourier transforms of the associated frame wavelets will be equal to the characteristic function of a "hyper-annulus" (a difference of two disks D/2 and D in 2D, a difference of two spheres D/2 and D in 3D, a difference of two hyperspheres D/2 and D in nD), modulated by a phase factor.

For the 2D case, we create up to four frame wavelets; each of these wavelets defines a high-pass filter, or a similar wavelet like form. In the time (or complementary) domain, both the scaling functions and the wavelets can be constructed as linear combinations of Bessel functions. These constructions are currently based on dyadic dilations, but other dilations are equally usable only affecting a shape of the low and high pass filters. For example, dilations induced by quincunx matrices yield low and high pass filters of the same structure.

A unique merit of our construction is that it leads to the definition and realization of low and high pass filters, which are intrinsically non-separable and isotropic to a degree that has never been achieved in the past and, which are, in fact, optimal. Our construction can be explicitly realized in any finite number of dimensions. The resulting scaling functions are interpolating in all cases.

The present invention can be implemented on any processing unit that is capable of executing instructions corresponding to the mathematical constructs and filters set forth in this application. Suitable processing units include, without limitation, analog processing units, digital processing units or mixtures or combinations thereof. These processing units are generally components of a computer of other device including a processing unit and peripherals capable of human interaction (keyboards and the like). Suitable computers include those manufacture and sold through out the industry based on chips from companies like Intel, Motorola, IBM, HP, Sun Microsystems, Cirex, AMD, or others and sold in computers manufactured and/or sold by companies such as Dell, Apple, IBM, HP, Toshiba, Sony, or similar computers. The processing units and computers incorporating them are designed to execute software under the control of an operating system. Suitable operating systems include, without limitation, the WINDOWS operating systems from MicroSoft, the OS operating systems from Apple, the LINUX operating systems available from a variety of vendors, or other windowing operating systems. The techniques set forth in this application can be converted to software code in an number of convenient computer languages such as Fortran, C, C+, C++, or the like or newer programming languages geared to programming mathematical expressions.

Introduction and Preliminaries

Let H be a complex Hilbert space. A unitary system $\mathbb{R}$ is a set of unitary operators acting on H which contains the identity operator I on H. Now, let D be a (dyadic) Dilation operator $$(Df)(t)=2^{n/2}f(2t), f \in L^2(\mathbb{R}^n) \tag{1}$$

and $T_k$ be a Translation operator defined by $$(T_k f)(t)=f(t-k), f \in L^2(\mathbb{R}^n), k \in Z^n \tag{2}$$

We refer to the unitary system $\mathcal{U}_{D,Z^n}:=\{D^j T_k: j \in Z, k \in Z^n\}$ as an n-dimensional separable Affine system.

This system has been extensively used in wavelet analysis for the construction of separable wavelet bases. In fact, only a few non-separable wavelet bases have been constructed and all these examples were exclusively given in two dimensions. However, an important drawback of these families of wavelets is the absence of enough symmetry and differentiability and the absolute lack of isotropy. These examples were also given with respect to a small class of dilation operators and all of them are compactly supported in the time domain. Apparently the whole issue of designing wavelet bases in multidimensions still remains a mostly unexplored area, full of challenges and revealing interesting and surprising results.

The motivation for the present invention stems from the following elementary observation: The low pass filter corresponding to the scaling function of the Shannon MRA is the indicator function of the interval $[-½, ½)$. This function is even and minimally supported in the frequency, i.e., its Fourier transform is of the form $\hat{\omega}=\chi_A$, where A is a measurable subset of $\mathbb{R}$. Keeping in mind that even functions are also radial (a function is radial if it depends only on the radial variable) one might wonder, what is the multidimensional analogue of even, minimally supported in the frequency scaling functions.

This particular problem motivated us to introduce the radial frame multiresolution analysis. Our construction is based on a very general multiresolution scheme of abstract Hilbert spaces developed by Papadakis in M. Papadakis. Generalized Frame Multiresolution Analysis of Abstract Hilbert Spaces. 2001, namely the Generalized Frame Multiresolution Analysis (GFMRA). The main characteristic of GFMRAs is that they can be generated by redundant sets of frame scaling functions. In fact, GFMRAs encompass all classical MRAs in one and multidimensions as well as the FMRAs of Benedetto and Li (see J. J. Benedetto and S. Li. The Theory of Multiresolution Analysis Frames and Applications to Filter Banks. *Appl. Comp. Harm. Anal.*, 5:389-427, 1998).

In this invention, we construct non-separable Shannon-like GFMRAs of $L^2(\mathbb{R}^n)$ whose scaling functions are radial and are defined with respect to certain unitary systems, which we will later introduce. We also derive certain of their associated frame multiwavelet sets. Our construction is the first of its kind. Scaling functions that are radial have not been constructed in the past. However, certain classes of non separable scaling functions in two dimensions, with some continuity properties with respect to dyadic dilations or dilations induced by the Quincunx matrix only have been constructed in the past (e.g., A. Cohen and I. Daubechies. Nonseparable Bidimensional Wavelet Bases. *Revista Matematica Iberoamericana*, 9:51-137, 1993; J. Kovacevic and M. Vetterli. Nonseparable Multidimensional Perfect Reconstruction Filter-banks. *IEEE Transactions on Information Theory*, 38:533-555, 1992; W. He and M. J. Lai. Examples of Bivariate Nonseparable Compactly Supported Orthonormal Continuous Wavelets, In M. Unser, A. Aldroubi, A. Laine editor, *Wavelet Applications in Signal and Image Processing IV*, volume 3169 of *Proceedings SPIE*, pages 303-314, 1997; K. Grochenig and W. Madych. Multiresolution Analysis, Haar Bases and Self-Similar Tilings. *IEEE Transactions on Information Theory*, 38:558-568, 1992; and A. Ayache, E. Belogay, and Y. Wang. Orthogonal Lifting: Constructing New (Symmetric) Orthogonal Scaling Functions. 2002.). All of them have no axial symmetries and are not smooth, except those contructed in E. Belogay and Y. Wang. Arbitrarily Smooth Orthogonal Nonseparable Wavelets in $r^2$. *SIAM Journal of Mathematical Analysis*. 30:678-697, 1999, which can be made arbitrarily smooth, but are highly asymmetric. Another construction in the spirit of digital filter design, but not directly related to wavelets can be found in E. H. Adelson, E. Simoncelli, and R. Hingoranp. Orthogonal Pyramid Transforms for Image Coding. In *Visual Communications and Image Processing II*, Volume 845 of *Proceedings SPIE*, pages 50-58, 1987 and E. P. Simoncelli, W. T. Freeman, E. H. Adelson, and J. P. Hager. Shiftable Multi-Scale Transforms. *IEEE Transactions Information Theory*, 38(2):587-607, 1992. The latter construction and this of curvelets (e.g., see J. Starck, E. J. Candes, and D. L. Donoho, The Curvelet Transform for Image Denoising. *IEEE Transactions Image Processing*, 11(6): 670-684, 2002) share two properties of our Radial GFMRAs: the separability of the designed filters with respect to polar coordinates and the redundancy of the induced representations. However, our construction in contrast to those due to Simoncelli et. al. and to Starck et al. are in the spirit of classical multiresolution analysis and can be carried out to any number of dimensions and with respect to a variety of dilation matrices.

The merit of non separable wavelets and scaling functions is that the resulting processing of images is more compatible with that of human or mammalian vision, because mammals do not process images vertically and horizontally as separable filter banks resulting from separable multiresolution analyses do (M. Vetterli and J. Kovacevic. *Wavelets and Subband Coding*, Prentice Hall PTR, Englewood Cliffs, N.J., 1995). As Marr suggests in his book D. Marr. *Vision, A Computational Investigation into the Human Representation and Processing of Visual Information*. W. H. Freeman and Co., New York, N.Y., 1982, the human visual system critically depends on edge detection. In order to model this detection, Marr and Hildreth used the Laplacian operator, which is a "lowest order isotropic operator" (D. Marr and E. Hildreth, The Theory of Edge Detection. *Proc. R. Soc. London B*, 207:187-217, 1980), because our visual system is orientation insensitive to edge detection. Thus, the most desirable property in filter design for image processing is the isotropy of the filter. Radial scaling functions for multiresolutions based on frames are the best (and, according to proposition 5, the only) type of image processing filters that meet the isotropy requirement.

Definitions

Before we proceed, we need a few definitions and results from M. Papadakis, "Generalized Frame Multiresolution Analysis of Abstract Hilbert Spaces, 2001"

The family $\{x_i : i \in I\}$ is a frame for the Hilbert space H, if there exist constants A, B>0 such that for every $x \in H$, we have $$A\|x\|^2 \leq \sum_{i \in I} |\langle x, x_i \rangle|^2 \leq B\|x\|^2$$

We refer to the positive constants A, B as frame bounds. Apparently for every frame, its bounds are not uniquely defined. We refer to the frame as a tight frame if A=B and as a Parseval frame if A=B=1. A frame $\{x_i : i \in I\}$ of H is called exact if each one of its proper subsets is not a frame for H. Riesz bases are exact frames and vice-versa. The operator S defined by $$S_x = \{\langle x, x_i \rangle\}_{i \in I}, x \in H$$

is called the Analysis operator corresponding to the frame $\{x_i : i \in I\}$. Using this operator, we can construct a dual frame $\{x'_i : i \in I\}$ of $\{x_i : i \in I\}$ by setting $x'_i = (S^*S)^{-1} x_i$. Then, for every $x \in H$ we have $$x = \sum_i \langle x, x'_i \rangle x_i$$

We are interested in unitary systems $\mathcal{U}$ of the form $\mathcal{U} = \mathcal{U}_0 G$, where $\mathcal{U}_0 = \{U^j : j \in Z\}$ and G is an abelian unitary group. We will often refer to G as a translation group. Unitary systems of this form generalize the affine system.

Definition 1

A sequence $\{V_j\}_{j \in Z}$ of closed subspaces of an abstract Hilbert space H is a Generalized Frame Multiresolution Analysis of H if it is increasing, i.e., $V_j \subseteq V_{j+1}$ for every $j \in Z$ and satisfies the following properties:

(a) $V_j = U^j(V_0)$, $j \in Z$ (b) $\cap_j V_j = \{0\}$, $\overline{\cup_j V_j} = H$ (c) There exists a countable subset B of $V_0$ such that the set $G(B) = \{g\phi : g \in G, \phi \in B\}$ is a frame of $V_0$.

Every such set B is called a frame multiscaling set for $\{V_j\}_j$. Every subset C of $V_1$ such that $G(C) = \{g\psi : g \in G, \psi \in C\}$ is a frame of $W_0 = V_1 \cap V_0^\perp$ and is called a semi-orthogonal frame multiwavelet vector set associated with $\{V_j\}_j$.

$G(B')$ is the canonical dual of $G(B)$, where $B' = \{(S^*S)^{-1}\phi : \phi \in B\}$, where S is the Analysis operator corresponding to the frame $G(B)$. Likewise the canonical dual of $G(C)$ is the family $G(C')$, where $C' = \{(S^*S)^{-1}\psi : \psi \in C\}$. We refer to B' and as a dual frame scaling set corresponding to B and to C' as a dual frame wavelet set corresponding to C.

If B is a singleton, we refer to its unique element as a frame scaling vector and, if $H=L^2(\mathbb{R}^n)$, we refer to its unique element as a frame scaling function. We also let $W_j=U^j(W_0)$, for every $j\in\mathbb{Z}$. Thus, if C is a semi-orthogonal frame multiwavelet vector set associated with the GFMRA $\{V_j\}_j$, then the set $\{D^j g\psi : j\in\mathbb{Z}, g\in G, \psi\in C\}$ is a frame for H with the same frame bounds as the frame G(C).

In order to accomplish the construction of the frame multiwavelet sets associated with a GFMRA $\{V_j\}_j$, we need the following additional hypotheses.

There exists a mapping $\sigma: G\to G$ satisfying $$gD = D\sigma(g), \text{ for every } g\in G$$

This particular assumption implies that $\sigma$ is an infective homomorphism and $\sigma(G)$ is a subgroup of G. (See D. Han, D.R. Larson, M. Papadakis, and T. Stavropoulos. Multiresolution Analysis of Abstract Hilbert Spaces and Wandering Subspaces. In D. R. Larson L. Baggett, editor, *The Functional and Harmonic Analysis of Wavelets and Frames*, volume 247 of *Cont. Math.*, pages 259-284. *Amer. Math. Soc.*, 1999 for proofs) $|G:\sigma(G)|=n<+\infty$, where $|G:\sigma(G)|$ is the index of the subgroup $\sigma(G)$.

As mentioned before in this invention, we will exclusively use multidimensional affine unitary systems. Before proceeding further with the construction, we need the following definition:

Definition 2

An n×n invertible matrix A is expanding if all its entries are real and all its eigenvalues have modulus greater than 1. A Dilation matrix is an expanding matrix that leaves $\mathbb{Z}^n$ invariant, i.e., $A(\mathbb{Z}^n)\subseteq \mathbb{Z}^n$.

The previous definition readily yields the following observations: (a) all the entries of a dilation matrix are integers, because such a matrix leaves $\mathbb{Z}^n$ invariant; and (b) the previous observation implies that determinant of A (detA) is an integer.

The multidimensional affine unitary systems we are interested in are the systems of the form $\mathcal{U}_0 G$, where $\mathcal{U}_0$ is a cyclic torsion free group generated by a dilation operator D defined by $$Df(t) = |\det A|^{1/2} f(At), f\in L^2(\mathbb{R}^n)$$

where A is a dilation matrix and $G=\{T_k : k\in \mathbb{Z}^n\}$ and G is isomorphic with $\mathbb{Z}^n$. Using the definitions of translations and dilations, we can easily verify $T_k D = DT_{Ak}$, thus $\sigma(T_k)=T_{Ak}$, for every $k\in\mathbb{Z}^n$. Therefore, $\sigma$ is legitimately defined, because $A(\mathbb{Z}^n)\subseteq\mathbb{Z}^n$. Apparently, the quotient group $G/\sigma(G)$ is homeomorphically isomorphic with $\mathbb{Z}^n/A(\mathbb{Z}^n)$. Thus we have $|G:\sigma(G)|=|\mathbb{Z}^n:A(\mathbb{Z}^n)|=|\det A|$. Now, we set $q_0=0$, $p=|\det A|$ and we fix $q_r\in\mathbb{Z}^n$, for $r=1, 2, \ldots, p-1$ so that $$\mathbb{Z}^n/A(\mathbb{Z}^n)=\{q_r+A(\mathbb{Z}^n): r=0, 1, \ldots, p-1\}$$

The translation group G is induced by the lattice $\mathbb{Z}^n$. Although our results will be obtained with respect to this particular lattice only, our methods can be easily extended to all regular lattices, i.e., lattices of the form $C(\mathbb{Z}^n)$, where C is an n×n invertible matrix. Using a traditional approach of Harmonic and Fourier analysis, we give the definition of the Fourier transform on $L^1(\mathbb{R}^n)$:

$$\hat{f}(\xi)=\int_{\mathbb{R}^n} f(t) e^{-2\pi i t\cdot \xi} dt, \xi\in\mathbb{R}^n$$

We also reserve $\mathcal{F}$ to denote the Fourier transform on $L^2(\mathbb{R}^n)$. In addition, we adopt the notation $T^n=[-\frac{1}{2}, \frac{1}{2})^n$ and $\delta_i=$ ($i\in I \subseteq \mathbb{N}$) for the sequence defined by $$\delta_i(l) = \begin{cases} 1 & \text{if } l=i \\ 0 & \text{if } l\neq i \end{cases}$$

Before proceeding, we need to include some final remarks on our notation. If A is a subset of a topological vector space, then [A] denotes its linear span and $A^-$ denotes the closure of A. Moreover, if B is a matrix (even an infinite one), then $[B]_i$ denotes the i-th column of B. We conclude this section with the characterization of the autocorrelation function of a set of frame generators of a shift-invariant subspace of $L^2(\mathbb{R}^n)$, i.e., of a set of functions $\{\phi_l : l\in I\}$ such that $\{T_k \phi_l : l\in I\}$ is a frame for its closed linear span.

Lemma 1.1

Let $I\subseteq \mathbb{N}$ and $\{\phi_k : k\in I\}$ be a subset of $L^2(\mathbb{R}^n)$. Define $$a_{l,k}(\xi) = \sum_{m\in\mathbb{Z}^n} \hat{\phi}_k(\xi+m)\overline{\hat{\phi}_l(\xi+m)} \; k, l \in I, \xi \in T^n$$

and $a_k(\xi)=(a_{1,k}(\xi), a_{2,k}(\xi), \ldots)$.

Now assume that for every $k\in I$ the function $\xi\to \|a_k(\xi)\|_{\ell^2}$ is in $L^2(T^n)$ and that the linear operators $\Phi(\xi)$ defined for a.e. $\xi\in T^n$ on $[\delta_k : k\in I]$ by the equation $\Phi(\xi)\delta_k=a_k(\xi)$ satisfy the following properties:

(1) $\Phi$ belongs to $L^\infty(T^n, \mathcal{B}(\ell^2(I)))$, i.e., $\Phi$ is weakly measurable and for a.e. $\xi\in T^n$ the operator $\Phi(\xi)$ belongs to $\mathcal{B}(\ell^2(I))$ and $\|\Phi\|_\infty = \operatorname{essup}\{\|\Phi(\xi)\| : \xi\in T^n\}<\infty$ (2) Let $P(\xi)$ be the range projection of $\Phi(\xi)$ a.e. There exists $B>0$ such that for every $x\in P(\xi)(\ell^2(I))$ we have $B\|x\|\leq \|\Phi(\xi)x\|$.

Then $\{T_k \phi_l : l\in I, k\in \mathbb{Z}^n\}$ is a frame for its closed linear span with frame bounds B and $\|\Phi\|_\infty$.

Conversely, if $\{T_k \phi_l : l\in I, k\in \mathbb{Z}^n\}$ is a frame for its closed linear span with frame constants B, C, then there exists $\Phi\in L^\infty(T^n, \mathcal{B}(\ell^2(I)))$ such that $\|\Phi\|_\infty \leq C$ also satisfying $$\Phi(\xi)_{l,k} = a_{l,k}(\xi) \; k,l\in I, \text{a.e. } T^n$$

and property (2). Finally, $\{T_k \phi_l : l\in I, k\in\mathbb{Z}^n\}$ is a Parseval frame for its closed linear span if and only if $\Phi(\xi)$ is for a.e. $\xi$ an orthogonal projection.

The function $\Phi$ is also known as the Grammian of the set $\{\phi_l : l\in I\}$.

Radial FMRAs

In the this section, we will develop the theory of singly generated GFMRAs of $L^2(\mathbb{R}^n)$ defined by radial frame scaling functions. We refer to these GFMRAs as Radial FMRAs. According to lemma 1.1, the Fourier transforms of frame scaling functions cannot be continuous. Thus, such scaling functions cannot have a variety of forms, but this drawback can be rectified by using frame multiscaling functions. However, in this invention, we will be exclusively using Minimally Supported in the Frequency (MSF) frame scaling functions. A function is MSF if the modulus of its Fourier transform is of the form $\chi_A$, where A is a measurable subset of $\mathbb{R}^n$.

Our translation group is group-isomorphic to $\mathbb{Z}^n$, so we can easily see that the regular representation of G on $\ell^2(G)$, defines a group, which we denote by $G^*$ and is homeomorphically isomorphic to the discrete group $\mathbb{Z}^n$. Therefore, the dual group $G^*$ is homeomorphically isomorphic to the n-dimensional torus $T^n$. So, instead of using $\hat{G}^*$, we use $T^n$, recalling that we identified $T^n$ with the product space $[-\frac{1}{2}, \frac{1}{2})^n$.

Now, let D be the sphere with radius $\frac{1}{2}$ centered at the origin, and $\phi$ be such that $\hat{\phi}=\chi_D$. Since $\Phi(\xi)=\chi_D(\xi)$, for every $\xi \in T^n$, we have that $\{T_k\phi:k\in Z^n\}$ is a Parseval frame for its closed linear span, which from now on, we will denote with $V_0$. We will consider dilations induced by dilation matrices A satisfying the following property.

Property D

There exists $c>1$ such that for every $x\in \mathbb{R}^n$ we have $c\|x\|\leq\|Ax\|$.

Property D implies $\|A^{-1}\|\leq c^{-1}<1$. However, it is interesting to note that Property D cannot be derived from the definition of dilation matrices. This fact can be demonstrated by the following example. Let $$A = \begin{pmatrix} 2 & 5 \\ 0 & 2 \end{pmatrix}$$

We can clearly see that A is invertible and leaves the integer lattice invariant, because all its entries are integers. However, $$A^{-1} = \frac{1}{4}\begin{pmatrix} 2 & -5 \\ 0 & 2 \end{pmatrix}$$

Since one of the entries of $A^{-1}$ has absolute value greater than 1, we get $\|A^{-1}\|>1$, so A does not satisfy Property D.

Now, define $V_j=D^j(V_0)$, where $j\in Z$. We will now establish $V_{-1}\subseteq V_0$. First, let $B=A^T$, where the superscript T denotes the transpose operation. Since $(A^T)^{-1}=(A^{-1})^T$ and the operator norm of a matrix is equal to the operator norm of its transpose, we obtain that dilation matrices A satisfying Property D, therefore, satisfies $\|B^{-1}\|<1$. Thus, $B^{-1}(D)$ is contained in D. Next, we let $\mu_0$ be the measurable function defined on $\mathbb{R}^n$ such that $\mu_0(\xi)=\chi_{B^{-1}(D)}(\xi)$, for every $\xi\in T^n$, which is periodically extended on $\mathbb{R}^n$ with respect to the tiling of $\mathbb{R}^n$ induced by the integer translates of $T^n$. Then, $\mu_0$ belongs to $L^2(T^n)$ and satisfies $$\hat{\phi}(B\xi)=\mu_0(\xi)\hat{\phi}(\xi) \text{ a.e.}$$

because $\hat{\phi}(B\xi)=\chi_{B^{-1}(D)}(\xi)$, for every $\xi\in \mathbb{R}^n$. This implies that $D^*\phi$, belongs to $V_0$, which in turn establishes $V_{-1}\subseteq V_0$ and thus $V_j\subseteq V_{j+1}$, for every integer j. Since $\mathcal{J}(V_j)=L^2(B^j(D))$, for all $j\in Z$, we finally obtain that both properties of the definition of a GFMRA are satisfied. From the preceding argument, we conclude that $\{V_j\}_j$ is a GFMRA of $L^2(\mathbb{R}^n)$, singly generated by the radial scaling function $\phi$. So $\{V_j\}_j$ is a Radial FMRA of $L^2(\mathbb{R}^n)$. We may also occasionally refer to $\phi$ as a Parseval frame scaling function in order to indicate that $\{T_k\phi:k\in Z^n\}$ is a Parseval frame for $V_0$.

Following previously developed terminology and the notation, the analysis operator S induced by the frame scaling set $\{\phi\}$ maps $V_0$ into $L^2(T^n)$ and is defined by $$Sf = \sum_{k\in Z}\langle f, T_k\phi\rangle e_k$$

where $e_k(\xi)=e^{-2\pi i(\xi\cdot k)}$ for every $\xi\in \mathbb{R}^n$. Since $\phi$ is a Parseval frame scaling function, we obtain that S is an isometry. Moreover, it is not hard to verify that the range of S is the subspace $L^2(D)$.

Thus, the low pass filter $m_0$ corresponding to $\phi$ is given by $m_0=SD^*\phi$. Because we consider $\{V_j\}_j$ as singly generated, we have only one low pass filter, so $M_0$, the low pass filter associated with the frame multiscaling set $\{\phi\}$ is equal to $m_0$. Since S is an isometry, we obtain Y=S, where Y is defined by the polar decomposition of S, namely S=Y|S|. In fact, we have $Y=S=\mathcal{J}|_{V_0}$. This implies that $\tilde{m}_0=YD^*\phi=m_0$, and, therefore, $\tilde{M}_0=\tilde{m}_0=M_0$. Let us now find $m_0$. Taking the Fourier transforms of both sides of $$D^*\phi = \sum_{k\in Z^n}\langle D^*\phi, T_k\phi\rangle T_k\phi \quad (3)$$

we obtain $$\hat{\phi}(B\xi)=|\det A|^{-1/2}m_0(\xi)\hat{\phi}(\xi) \text{ a.e.} \quad (4)$$

We recall $$\hat{\phi}(B\xi)=\mu_0(\xi)\hat{\phi}(\xi) \text{ a.e.} \quad (5)$$

Unfortunately, the fact that, the set of the integer translates of $\phi$ is not a basis for $V_0$, but an over complete frame, does not automatically imply that $|\det A|^{1/2}\mu_0=m_0$. However, both $m_0$ and $\mu_0$ vanish outside D, so equations (4) and (5) imply $$m_0(\xi)=|\det A|^{1/2}\chi_{B^{-1}(D)}(\xi), \xi\in T^n \quad (6)$$

All radial functions of the form $\chi_D$, where D is a sphere centered at the origin with radius $r<\frac{1}{2}$ are radial Parseval frame scaling functions. We will not distinguish this particular case from the case $r=\frac{1}{2}$, because the latter case is generic and also optimizes the frequency spectrum subject to subband filtering, induced by this particular selection of the scaling function $\phi$. This frequency spectrum is equal to the support of the autocorrelation function of $\phi$, because every signal in $V_0$ will be encoded by the Analysis operator with an $\ell^2(Z)$-sequence, whose Fourier transform has support contained in D. Therefore, the frequency spectrum subject to subband filtering induced by $\{V_j\}_j$ equals D. This suggests that a pre-filtering step transforming a random digital signal into another signal whose frequency spectrum is contained in D is necessary prior to the application of the decomposition algorithm induced by $\{V_j\}_j$. This pre-filtering step is called initialization of the input signal. In the light of these remarks, one might wonder whether we may be able to increase the frequency spectrum that these FMRAs can filter by allowing $r>\frac{1}{2}$. We will later show that the selection $r=\frac{1}{2}$ is optimum.

The frame scaling function can be determined in terms of Bessel functions, because it is a radial function.

$$\phi(R) = \frac{J_{n/2}(\pi R)}{(2R)^{n/2}}, R>0$$

The proof of equation (7) can be found in M. Pinsky. *An Introduction to Fourier Analysis and Wavelets*. 2001 Lemma 2.5.1.

We will not give any details regarding Bessel functions. However, the reader may refer to M. Pinsky. *An introduction to Fourier Analysis and Wavelets*. 2001 and G. E. Andrews, R. Askey, and R Roy. *Special Functions*. Number 71 in Encyclopedia of Mathematics. Cambridge University Press, 2000 for an extensive treatment of their main properties and of course to the bible of the topic G. N. Watson. *A Treatise on the Theory of Bessel Functions*. Cambridge Mathematical Library. Cambridge University Press, 1944. Here, we only include the following formula.

$$J_a(x) = \sum_{k=0}^{\infty} \frac{(-1)^k (x/2)^{2k+a}}{k! \Gamma(k+a+1)}, a > -1, x > 0$$

The function, $J_a$, given by the above equation is called the Bessel function of the first kind of order a.

Apparently every function in $V_0$ is band limited, because its Fourier transform is supported on D. Because D is contained in $T^n$, we infer from the classical sampling theorem that if f is in $V_0$, then $$f = \sum_{k \in Z^n} f(k) T_k \omega \qquad (8)$$

where the RHS of the previous equation converges in the $L^2$-norm and $\omega(x_1, x_2, x_n) = \Pi_{q=1}^n \sin(\pi x_q)/\pi x_q$. If $P_0$ is the projection onto $V_0$, then applying $P_0$ on both sides of equation (8) gives $$f = \sum_{k \in Z^n} f(k) P_0(T_k \omega) = \sum_{k \in Z^n} f(k) T_k P_0(\omega)$$

because $P_0$ commutes with the translation operator $T_k$, for every $k \in Z^n$. Since $P_0(\omega) = \Phi$, we conclude the following sampling theorem:

Theorem 3

Let f be in $V_0$. Then, $$f = \sum_{k \in Z^n} f(k) T_k \phi \qquad (9)$$

where the RHS of equation (9) converges in the $L^2$ norm. Moreover, the same series converges uniformly to f, if we assume that f is continuous.

Proof

The first conclusion of the theorem has already been established. We will now prove the uniform convergence to f of the series in the RHS of equation (9) assuming that f is continuous. Let $t \in \mathbb{R}^n$. Then, for $N \in \mathbb{N}$, we have $$\left| f(t) - \sum_{\|k\|_\infty \leq N} f(k) T_k \phi(t) \right| \qquad (10)$$

$$= \left| \int_{T^n} \left( \hat{f}(\xi) - \sum_{\|k\|_\infty \leq N} f(k) e^{-2\pi i \xi \cdot k} \chi_D(\xi) \right) e^{2\pi i \xi \cdot t} dt \right| \qquad (11)$$

$$\leq \left\| \hat{f} - \sum_{\|k\|_\infty \leq N} f(k) e_k \chi_D \right\|_2 \qquad (12)$$

As $N \to \infty$ the first term of the RHS of the previous inequality tends to zero. This establishes the final conclusion of Theorem 3.

Remark 1

The continuity hypothesis that we imposed on f in order to derive the uniform convergence to f of the series in the RHS of equation (9) is not at all artificial. It is well known that since f is band-limited, f is almost everywhere equal to an infinitely differentiable function, namely the inverse Fourier transform of $\hat{f}$. Thus, instead of using f itself, we can use the reflection of $\mathcal{I}(\mathcal{I}(f))$.

Remark 2

Although $\phi$ is a radial function, its dilations $D^j \phi$, for $j \neq 0$ may cease to be radial, for if $j = -1$, then $\mathcal{I}(D^* \phi) = |\det A|^{1/2} \chi_{B^{-1}(D)}$ and $B^{-1}(D)$ may not be an isotropic domain. However, in several interesting cases of dilation matrices A all the dilations of $\phi$ are radial.

The preceding remark motivates the following definition:

Definition 4

An expansive matrix A is called radially expansive if A=aU, where a>0 and U is a unitary matrix.

Expansive matrices satisfy $a^n = |\det A|$ and $\|A\| = a$ and apparently radially expansive dilation matrices satisfy Property D. When this is the case, we immediately obtain that all $D^j \phi$ are radial functions as well, and, in particular, $$(D^{-1}\phi)(R) = \frac{J_{n/2}(\pi a^{-1} R)}{(2R)^{n/2}}, \quad R > 0 \qquad (13)$$

Combining equations (4), (6) and (13) we conclude $$\hat{m}_0(k) = \frac{J_{n/2}(\pi a^{-1} \|k\|)}{(2\|k\|)^{n/2}}, \quad k \in Z^n$$

Proposition 5

Let A be a radially expansive dilation matrix, and $D_r$ be a sphere having a radius r centered at the origin. Then, there exists an $r_0 > 0$ such that, if $r > r_0$ and $\phi = \mathcal{I}^{-1}(\chi_{D_r})$, then no measurable $Z^n$-periodic function $\mu$ satisfies $$\hat{\phi}(B\xi) = \mu(\xi) \hat{\phi}(\xi) \qquad (14)$$

for a.e. $\xi$ in $\mathbb{R}^n$. Thus, such a $\phi$ cannot be a frame scaling function.

Proof

Let $r>0$ and $\hat{\phi}=\chi_{D_r}$. Assume $A=aU$, where $a>1$. Then, $\hat{\phi}(B\xi)=\chi_{D_{r/a}}(\xi)$ a.e. $\xi$ in $\mathbb{R}^n$, which in conjunction with equation (14) implies $\mu(\xi)=\chi_{D_{r/a}}(\xi)$ for a.e. $\xi \in T^n$. If $$\frac{r}{a} \geq \frac{1}{\sqrt{2}},$$

then $\mu(\xi)=1$ for a.e. $\xi$ in $T^n$, which, due to the $Z^n$-periodicity of $\mu$, implies $\mu(\xi)=1$ a.e. in $\mathbb{R}^n$. This contradicts equation (14). Thus, $$r < \frac{a}{\sqrt{2}}.$$

Now, pick such an r. If $$r \leq r_0 = \frac{a}{a+1},$$

then $D_r$ and $k+D_{r/a}$, for every $k \in Z\setminus\{0\}$ do not intersect.

Now, assume $r>r_0$. In this case, we have $$1/2 < r_0 < r < \frac{a}{\sqrt{2}}.$$

Next translate $T^n$ by $u=(1, 0, 0, \ldots 0)$. Due to the periodicity of $\mu$, we have $\mu(\xi)=1$ for a.e. $\xi$ in the intersection of the sphere $u+D_{r/a}$ and $u+T^n$. Because $r>r_0$, we can find x such that max $$\left\{\frac{r}{a}, \frac{1}{2}\right\} < x < r_0.$$

Then, there exists a ball centered at $(x, 0, 0, \ldots, 0)$, which is contained in the intersection of $u+D_{r/a}$, $u+T^n$ and $\mathbb{R}^n\setminus D_r$ so, equation (14) fails to be true for every point in this ball.

If $\frac{1}{2}<r<r_0$, then $\phi=F^{-1}(\chi_{D_r})$ is a frame scaling function. This can be shown by invoking lemma 1.1, which establishes that $\{T_k\phi:k\in Z^n\}$ is a frame (but not a Parseval frame) for $V_0$ and the argument showing. $V_j=\mathcal{F}^{-1}(L^2(B_j(D)))$. We will omit the details of this proof since we think that this particular case is not as interesting as the case $r\leq \frac{1}{2}$, because the FMRAs defined by such frame scaling functions $\phi$ still cannot filter the entire n-dimensional torus $T^n$. Having finished this intermezzo, we return to the initial hypothesis, $r=\frac{1}{2}$.

Let us now discuss the construction of certain frame multiwavelet sets associated with $\{V_j\}_j$. The cardinality of the frame multiwavelet sets associated with the same GFMRA may vary. This observation indicates that there is room for alternate constructions of GFMRA frame multiwavelet sets. However, all these sets must satisfy certain necessary and sufficient conditions, which we present in theorem 6.

In the discussion that follows, we present two constructions of frame multiwavelet sets associated with $\{V_j\}_j$. Each one has its own merit. The first one does not depend on the dimension of the underlying Euclidean space $\mathbb{R}^n$, and we believe that it is the most elegant set of them all. The second one specifically applies only if the underlying space is $\mathbb{R}^2$ and the dilation operators are defined by $A=2I_2$ or $$A = \begin{pmatrix} 1 & 1 \\ -1 & 1 \end{pmatrix}.$$

It can be seen that both matrices are radially expansive dilation matrices. The latter of these two matrices generates the so-called Quincunx subsampling lattice. Subsampling lattices are used in the applications of the Decomposition and Reconstruction algorithms.

First Construction

Using a theorem relating to the radial FMRA $\{V_j\}_j$, we first set $\hat{V}_j=F(V_j)$ and $\hat{W}_j=F(W_j)$, where $j\in Z\hat{V}_0=F(V_0)=L^2(D)$, and that is a unitary operator on $L^2(\mathbb{R}^n)$. Combining these facts with $\hat{V}_{-1}=L^2(B^{-1}(D))$, we conclude $$\hat{W}_{-1}=\hat{V}_0\cap\hat{V}_{-1}^\perp=L^2(Q)$$

where Q is the annulus $D\cap(B^{-1}(D))^c$, and the superscript c denotes the set-theoretic complement. Since an arbitrary orthogonal projection R defined on a Hilbert space H maps every orthonormal basis of H onto a Parseval frame for R(H) (A. Aldroubi. Portraits of Frames. *Proceeding of the American Mathematical Society*, 123: 1661-1668, 1995, and D. Han and D. R. Larson. *Frames, Bases and Group Representations*, volume 147 of *Memoirs*. American Mathematical Society 2000), we obtain that the orthogonal projection defined on $L^2(T^n)$ by multiplication with the indicator function of Q gives a Parseval frame for $L^2(Q)$, namely the set $\{e_k\chi_Q:k\in Z^n\}$.

Next, observe that each $k\in Z^n$ belongs to exactly one of the elements of the quotient group $Z^n/A(Z^n)$; thus there exist a q and $r\in\{0, 1, \ldots, p-1\}$ such that $k=q_r+A(q)$. Therefore, $e_k=e_{q_r}e_{A(q)}$. We now define the following functions:

$$h_r=e_{q_r}\chi_Q \; r\in\{0,1,\ldots,p-1\} \quad (15)$$

Apparently $\{e_{A(k)}h_r:k\in Z^n, r=0, 1, \ldots, p-1\}$ is a Parseval frame for $L^2(Q)$, thus, for $\hat{W}_{-1}$ as well. Therefore, $\{T_{A(k)}F^{-1}h_r:k\in Z^n, r=0, 1, \ldots, p-1\}$ is a Parseval frame for $W_{-1}$, because the Fourier transform is unitary. Setting $\psi_r=D\mathcal{F}^{-1}h_r$ ($r=0, 1, \ldots, p-1$), we finally have that $\{T_k\psi_r:k\in Z^n, r=0, 1, \ldots, p-1\}$ is a Parseval frame for $W_0$, therefore $\{\psi_r:r=0, 1, \ldots, p-1\}$ is a Parseval frame multiwavelet set associated with the FMRA $\{V_j\}_j$. This concludes the first construction of a frame multiwavelet set associated with $\{V_j\}_j$.

The reader might wonder whether it is possible to give a more explicit formula for the frame wavelets $\psi_r$. In the light of remark 2, $\psi_0$ may not be radial as well. This may yield a rather unattractive time domain formula for all these wavelets. It is worth mentioning that $\psi_r$, where $r>0$, are never radial if $\psi_0$ is radial. However, if A is a radially expansive dilation matrix and $a=\|A\|$, then $$(F^{-1}h_0)(R) = \frac{J_{n/2}(\pi R)}{(2R)^{n/2}} - \frac{J_{n/2}(\pi R/a)}{(2aR)^{n/2}}, R>0$$

Therefore, under this assumption, $\psi_0$ is radial and $$\psi_0(R) = \frac{a^{n/2} J_{n/2}(\pi aR) - J_{n/2}(\pi R)}{(2aR)^{n/2}}, R > 0$$

and for r=1, 2, ..., p−1.

$$\psi_0(t) = DT_{q_r}D * \psi_0(t)$$
$$= \psi_0(t - A^{-1}q_r)$$
$$= \frac{a^{n/2} J_{n/2}(\pi a\|t - A^{-1}q_r\|) - J_{n/2}(\pi\|t - A^{-1}q_r\|)}{(2a\|t - A^{-1}q_r\|)^{n/2}}, t \in R^n$$

It can be seen that in this case $p=|\det A|=a^n$.

We now continue with the preliminaries of the second construction. From now on and until the end of the present section, we work with GFMRAs of $L^2(\mathbb{R}^2)$ only.

One of the instrumental tools of this construction is the square root of the autocorrelation function $\Phi$, which is defined by $A(\xi)^2=\Phi(\xi)$, a.e. on $T^n$. Also, the inverse of $A(\xi)$ is defined on the range of $\Phi(\xi)$ and is denoted by $A(\xi)^{-1}$. It can also been proved that the range projection P of the Analysis operator S is defined by $P\omega(\xi)=P(\xi)\omega(\xi)$, where $\omega \in L^2(T^n)$, and that for a.e. $\xi \in T^2$ the range projection of $\Phi(\xi)$ is the projection $P(\xi)$. For the sake of completeness, it must be noted that $P(\cdot)$ is a projection-valued weakly measurable function defined on $T^2$. Since $\Phi=\chi_D$, we deduce $P(\xi)=\chi_D(\xi)$ a.e. in $T^2$. The latter observation in conjunction with the preceding argument implies that $A(\xi)^{-1}=1$, if $\xi \in D$. For all other $\xi \in T^2$, we have $A(\xi)=0$, so for these $\xi$, we adopt the notational convention $A(\xi)^{-1}=0$. Last but not least, an abelian group very instrumental in the discussion that follows is the kernel of the homomorphism $\rho$ defined by $$\rho(\xi)(k) = e^{2\pi i (\xi \cdot A \cdot k)}, k \in Z^n$$

The latter equation implies that, for every $\xi \in T^2$, $\rho(\xi)$ is the unique point in $T^2$, such that $\rho(\xi)+k=A^T\xi$. The kernel of $\rho$ is homeomorphically isomorphic to a dual group of the quotient group $Z^2/A(Z^2)$ as shown in greater detail in reference M. Papadakis. Generalized Frame Multiresolution Analysis of Abstract Hilbert Spaces. 2001. Now, let us fix $k_r$, where r=0, 1, ..., p−1, in $T^2$, so that $\text{Ker}\rho=\{k_r: r=0, 1, ..., p-1\}$.

Theorem 6

Let $I \subseteq \mathbb{N}$. Assume $\tilde{H}: T^2 \to B(\ell^2(I), C)$. Define $$\tilde{Q}_2(\xi) = \sum_{r=0}^{p-1} \tilde{H}(\xi + k_r) * \tilde{H}(\xi + k_r)$$

Moreover, assume that the following conditions are satisfied (a) For a.e. $\in \text{supp} P_2$, where $P_2(\xi)$ is the range projection of the operator $\tilde{Q}_2(\xi)$, the operator $\tilde{Q}_2(\xi)|_{P_2(\xi)(\ell^2(I))}: P_2(\xi)(\ell^2(I)) \to P_2(\xi)(\ell^2(I))$ vertible and the functions $\xi \to \|\tilde{Q}_2(\xi)|_{P_2(\xi)(\ell^2(I))}\|$, $\xi \to \|(\tilde{Q}_2(\xi)|_{P_2(\xi)(\ell^2(I))})^{-1}\|$ are essentially bounded.

(b) For a.e. $\xi \in T^2$ the closed linear span of the columns of the matrix $$\begin{pmatrix} M_0(\zeta) & \tilde{H}(\xi) \\ M_0(\xi + k_1) & \tilde{H}(\xi + k_1) \\ \vdots & \vdots \\ M_0(\xi + k_{p-1}) & \tilde{H}(\xi + k_{p-1}) \end{pmatrix}$$

is equal to $\tilde{P}(\xi)(C^p)$, where $$\tilde{P}(\xi) = \sum_{r=0}^{p-1} \bigoplus \tilde{P}(\xi + k_r) \text{ a.e. in } T^2 \text{ and} \qquad (c)$$

$$0 = \sum_{r=0}^{p-1} M_0(\xi + k_r) * \tilde{H}(\xi + k_r) \text{ a.e.}$$

If we define $$\psi_i = \sum_{m,n \in Z} a_{m,n}^{(i)} DT_1^m T_2^n \phi$$

where $\{a_{m,n}^{(i)}: i \in I, m,n \in Z\}$ are defined by the equation $$[\tilde{H}(\cdot)]_i = \sum_{m,n \in Z} a_{m,n}^{(i)} e_{m,n}$$

then, $\{\psi_i: i \in I\}$ is a frame multiwavelet set associated with the FMRA $\{V_j\}_j$.

A measurable, $Z^2$-periodic operator-valued function $\tilde{H}$, satisfying the hypotheses of the previous theorem is called a high pass filter associated with $M_0$. If the dilation matrix satisfies Property D, then one choice for $\tilde{H}$ following from equation (15) is $$\tilde{H} = (e_{q_0}\chi_Q, e_{q_1}\chi_Q, \ldots, e_{q_{p-1}}\chi_Q)$$

Let us first study the case where the dilation matrix $A=2I^2$. In this case, it is well-known that p=4 and, that we can set $k_1=(\frac{1}{2},0)$, $k_2=(\frac{1}{2},\frac{1}{2})$ and $k_3=(0,\frac{1}{2})$ and recalling that addition in $T^2$ is defined modulo the integer lattice $Z^2$.

Thus, we have $$\tilde{P}(\xi) = \begin{pmatrix} \chi_D(\xi) & 0 & 0 & 0 \\ 0 & \chi_{D+k_1}(\xi) & 0 & 0 \\ 0 & 0 & \chi_{D+k_2}(\xi) & 0 \\ 0 & 0 & 0 & \chi_{D+k_3}(\xi) \end{pmatrix}$$

On the other hand, according to theorem 6, we must first determine the values of $\tilde{P}$ before finding the high pass filter $\tilde{H}$. All the values of $\tilde{P}$ are 4×4 diagonal matrices whose diagonal entries are either equal to 1 or 0. Therefore, the range of $\tilde{P}$ is finite.

So, we can find a partition of $T^2$, say $\{B_{(\epsilon_0,\epsilon_1,\epsilon_2,\epsilon_3)}\}$ where $(\epsilon_0, \epsilon_1, \epsilon_2, \epsilon_3)$ is the vector formed by the entries of the main diagonal of an arbitrary value of $\tilde{P}$. Each $\epsilon_p$, where p=0, 1, 2, 3, takes only two values, namely 0 and 1.

Since each of the sets $D+k_r$, where $r=0, 1, 2, 3$, overlap with at least another one of these sets, there will be no values of $\tilde{P}$ with a single non zero diagonal entry as shown in FIG. 1. The definition of the addition operation on $T^2$ implies that $D+k_1$ is the union of the two half disks with radii ½ centered at $k_1$ and $-k_1$; $D+k_3$ is the union of the two half disks with radii ½ centered at $k_3$ and $-k_3$; and, $D+k_2$ is the union of the four quarter disks with radii ½ centered at $k_2$, $-k_2$, $(-½,½)$ and $(½,-½)$. Since all four sets $D+k_r$, where $r=0, 1, 2, 3$, are symmetric with respect to both coordinate axes, it follows that all sets $B_{(\epsilon_0,\epsilon_1,\epsilon_2,\epsilon_3)}$ share the same symmetry property. This observation contributes a great deal in identifying these sets.

Referring now to Figure the subregions of $T^2$ corresponding to each one of the vectors $(\epsilon_0, \epsilon_1, \epsilon_2, \epsilon_3)$ are depicted. According to theorem 6, the values of the high pass filter $\tilde{H}$ must be row matrices. This is justified by the fact that $\{V_j\}_j$ is generated by a single scaling function. However, the range of every $\tilde{P}(\xi)$ is a subspace of $\mathbb{C}^4$. Furthermore, according to hypothesis (b) of theorem 6, the columns of the modulation matrix must span $\tilde{P}(\xi)(\mathbb{C}^4)$. Thus, we anticipate that the modulation matrix must have at least three more columns. So, $\tilde{H}(\tau)$ must be at least 1×3 matrix. For reasons that will become more clear herein, we choose $\tilde{H}(\xi)$ to be 1×4 matrix, for every $\xi \in T^2$, namely $$\tilde{H}(\xi) = 2(\tilde{h}_1(\xi), \tilde{h}_2(\xi), \tilde{h}_3(\xi), \tilde{h}_4(\xi)).$$

The factor 2 in the RHS of the previous equation is a normalization factor that helps to obtain a simple form for the each of the functions $\tilde{h}_i$. According to the conclusion of theorem 6, the columns of $\tilde{H}$, i.e., the functions $\tilde{h}_i$ ($i=1, 2, 3, 4$), define a frame multiwavelet set associated with $\{V_j\}_j$.

Therefore, the modulation matrix has the following form:

$$\begin{pmatrix} \chi_{D/2}(\xi) & \tilde{h}_1(\xi) & \tilde{h}_2(\xi) & \tilde{h}_3(\xi) & \tilde{h}_4(\xi) \\ \chi_{D/2+k_1}(\xi) & \tilde{h}_1(\xi+k_1) & \tilde{h}_2(\xi+k_1) & \tilde{h}_3(\xi+k_1) & \tilde{h}_4(\xi+k_1) \\ \chi_{D/2+k_2}(\xi) & \tilde{h}_1(\xi+k_2) & \tilde{h}_2(\xi+k_2) & \tilde{h}_3(\xi+k_2) & \tilde{h}_4(\xi+k_2) \\ \chi_{D/2+k_3}(\xi) & \tilde{h}_1(\xi+k_3) & \tilde{h}_2(\xi+k_3) & \tilde{h}_3(\xi+k_3) & \tilde{h}_4(\xi+k_3) \end{pmatrix}$$

a.e. in $T^2$

The disk $D/2$ has radius ¼, so this disk and all its translations by $k_r$ ($r=1, 2, 3$) have null intersections. Thus, for every $\xi$ in $T^2$, the first column of the modulation matrix has at most one non zero entry. Since, for every $\xi$ in $T^2$, the columns of the modulation matrix must span $\tilde{P}(\xi)(\mathbb{C}^4)$, we obtain the remaining columns of the modulation matrix, so that together with the first column they form the standard orthonormal basis of $\tilde{P}(\xi)(\mathbb{C}^4)$. Thus, the high pass filters $h_i$ are the $Z^2$-periodic extensions of the characteristic functions of certain measurable subsets of $T^2$. Next, we will identify those subsets of $T^2$, which we will denote by $C_i$, where $i=1, 2, 3, 4$.

Remark 3

Let $Q$ be the first quadrant of $T^2$. Then it is not difficult to verify that the family $\{Q+k_r : r=0, 1, 2, 3\}$ forms a partition of $T^2$, in the sense that $$T^2 = \bigcup_{r=0}^{3} Q + k_r,$$

but the intersections of every two of the sets $Q+k_r$ have zero measure. Now, let $\xi$ be in $Q+k_r$, then $\xi=\xi_0+k_r$, where $\xi_0 \in Q$. Without any loss of generality, we can assume $r=1$. Then, $$(\tilde{h}_i(\xi), \tilde{h}_i(\xi+k_1), \tilde{h}_i(\xi+k_2), \tilde{h}_i(\xi+k_3))^T = (\tilde{h}_i(\xi_0+k_1), \tilde{h}_i(\xi_0), \tilde{h}_i(\xi_0+k_3), \tilde{h}_i(\xi_0+k_2))^T$$

Thus, the values of the modulation matrix are completely determined by its values, when $\xi$ ranges only throughout the first quadrant.

Figure 2:
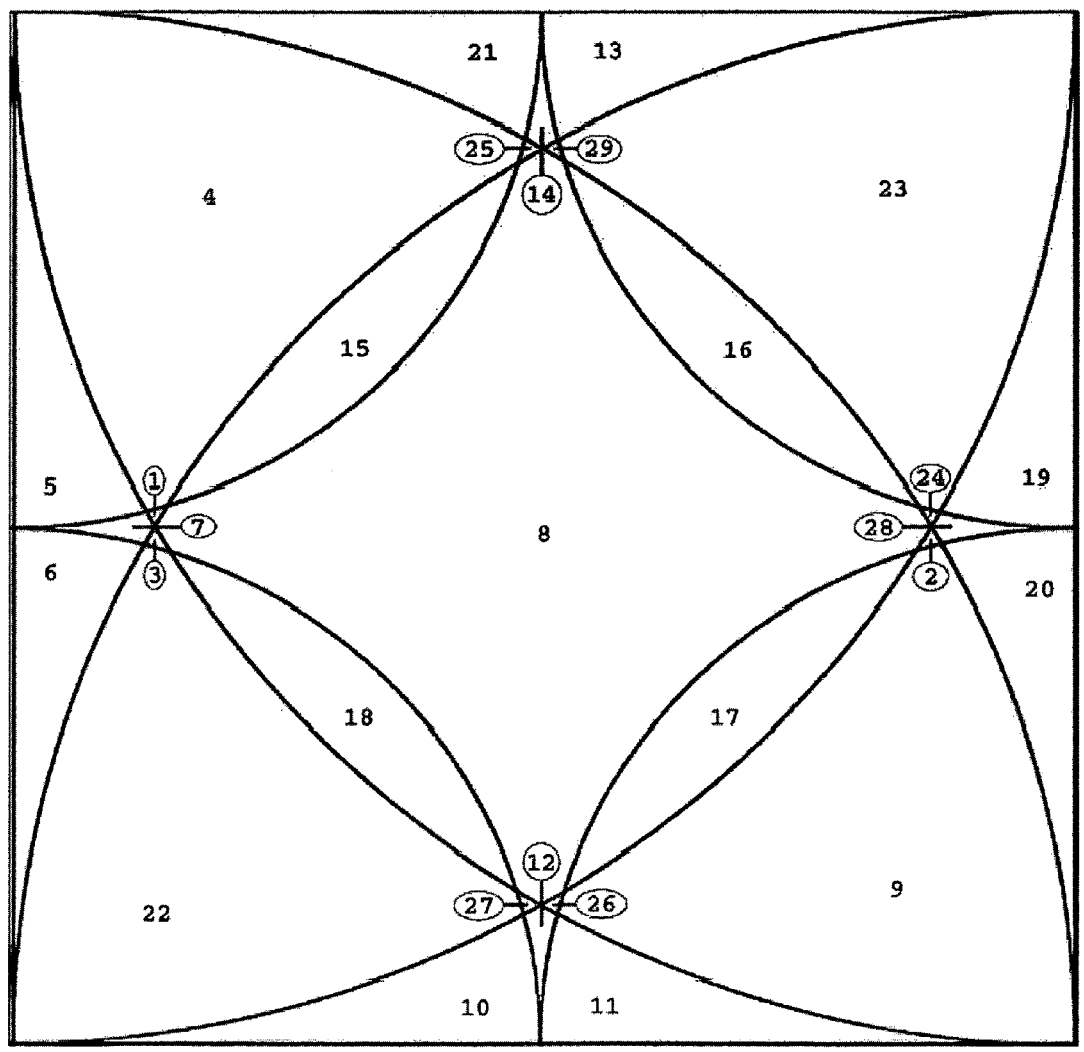
FIG. 2 depicts a partition of Q into 29 sets due to intersecting Q with $B(\epsilon_0, \epsilon_1, \epsilon_2, \epsilon_3)$.
Figure 3:
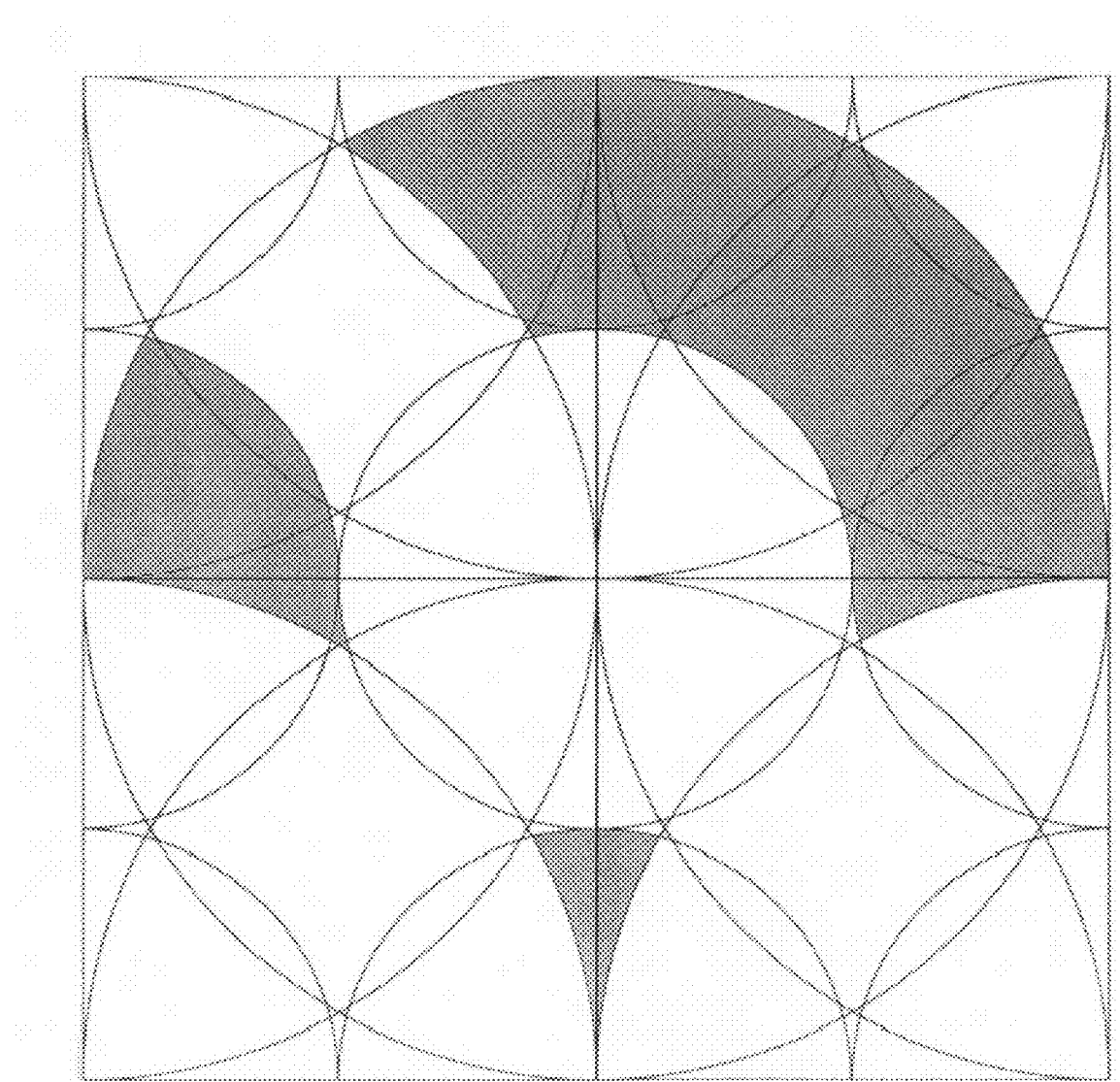
FIGS. 3-6 depict sets of $C_i$ for i equal to 1, 2, 3, and 4, respectively.
Figure 4:
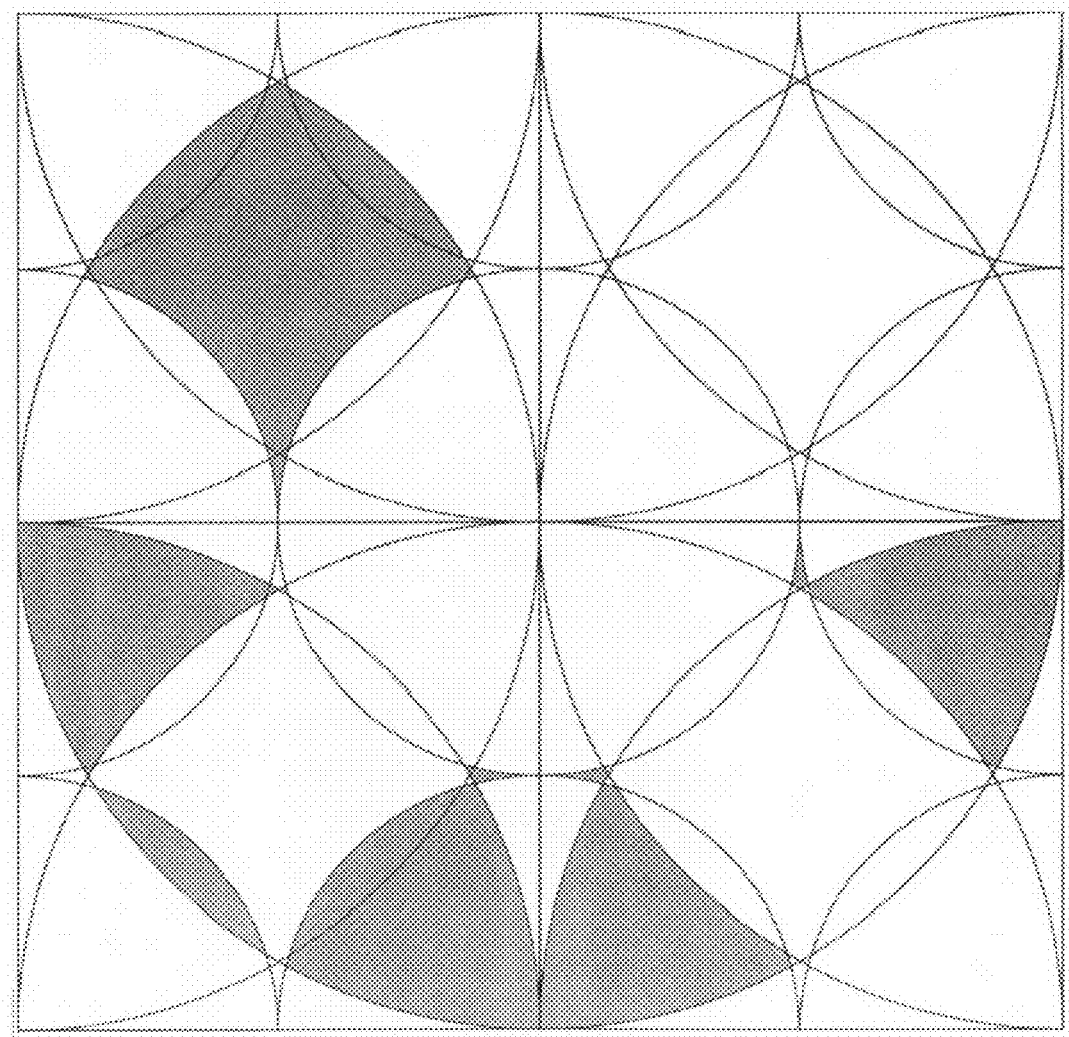
Figure 5:
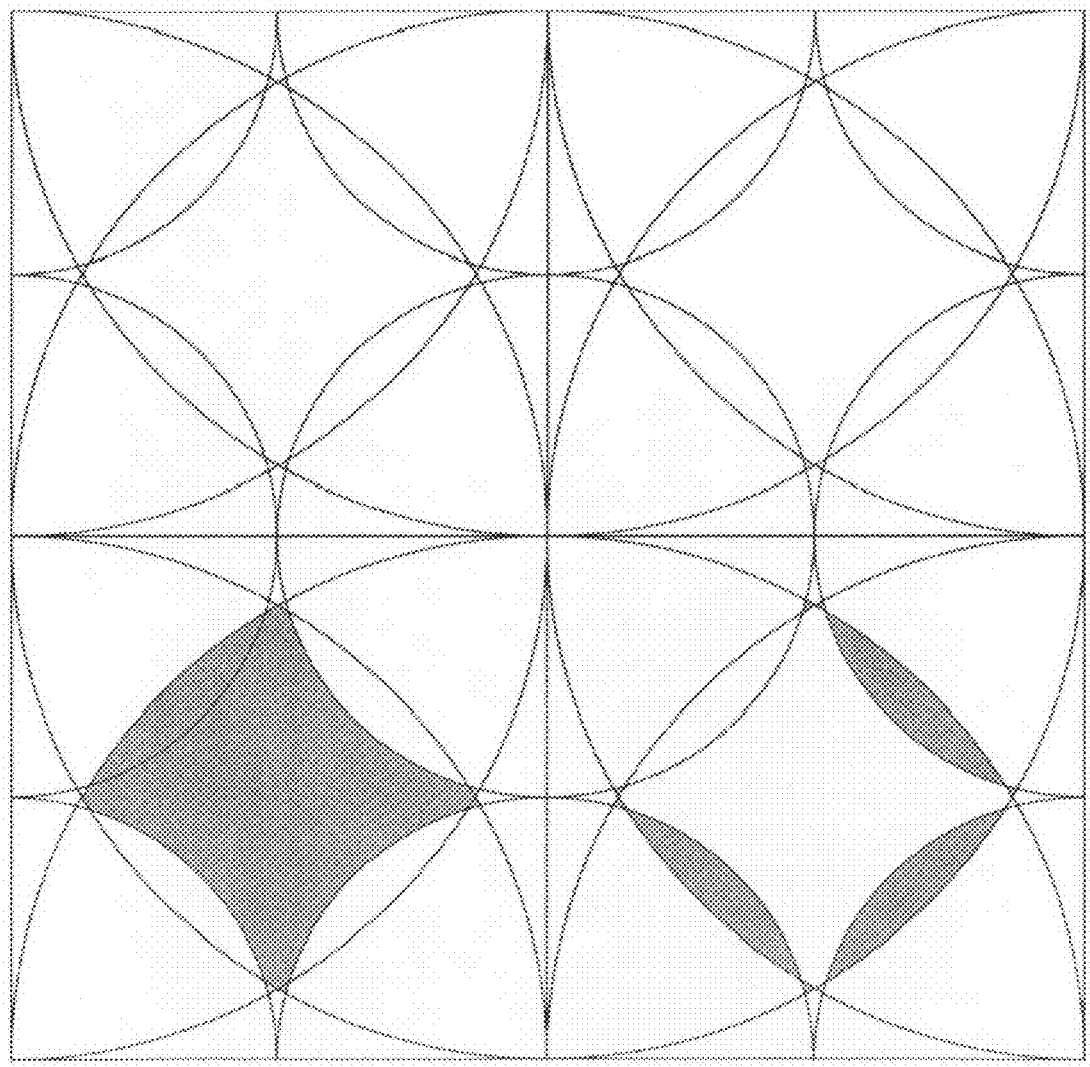

As we have previously mentioned, the family $\{B_{(\epsilon_0,\epsilon_1,\epsilon_2,\epsilon_3)}\}$ where $(\epsilon_0, \epsilon_1, \epsilon_2, \epsilon_3)$ ranges throughout the vectors formed by the diagonal entries of the values of $\tilde{P}$, is a partition of $T^2$. Therefore, $\{Q \cap B_{(\epsilon_0,\epsilon_1,\epsilon_2,\epsilon_3)}\}$ is a partition of $Q$. Furthermore, each of the sets $Q \cap B_{(\epsilon_0,\epsilon_1,\epsilon_2,\epsilon_3)}$ is, in turn, partitioned into a finite number of subsets which are formed by the intersections of $Q \cap B_{(\epsilon_0,\epsilon_1,\epsilon_2,\epsilon_3)}$ with each one of the disks $$\frac{D}{2}, \frac{D}{2}+k_1, \frac{D}{2}+k_2, \frac{D}{2}+k_3$$

and the complement of their unions. This results in a partition of $Q$ into 29 sets as shown in FIG. 2. We denote these sets by $E_s$, where $1 \leq s \leq 29$. We now have to obtain, for every $\xi$ in each of the sets $E_s$, the remaining four columns of the modulation matrix, so that they span $\tilde{P}(\xi)(\mathbb{C}^4)$. This process is not difficult to carry out. However, for the sake of the clarity, we deem it necessary to show how to specifically accomplish this task, when $\xi$ belongs to three of the sets $E_s$.

Case $s=1$

This set is contained in the complement of the union of the disks $$\frac{D}{2}+k_r, r=0, 1, 2, 3,$$

so the first column of the modulation matrix at $\xi$ is equal to zero. Now, let $\xi \in E_1$. On the other hand, $\tilde{P}(\xi)(\mathbb{C}^4) = \mathbb{C} \oplus 0 \oplus \mathbb{C} \oplus \mathbb{C}$, so we choose to complement the modulation matrix by setting its second, third and fourth columns equal to $(1, 0, 0, 0)^T$, $(0, 0, 1, 0)^T$ and $(0, 0, 0, 1)^T$, respectively, and the fifth column equal to zero.

Case $s=18$

Let $\xi \in E_{18}$. Then, $\tilde{P}(\xi)(\mathbb{C}^4) = \mathbb{C} \oplus \mathbb{C} \oplus \mathbb{C} \oplus \mathbb{C}$. Moreover, $$\xi = \frac{D}{2}.$$

This suggests the following form for the modulation matrix at $\xi$:

$$\begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \end{pmatrix}$$

Case s=19

Let $\xi \in E_{19}$. The $\tilde{P}(\xi)C^4)=0\oplus C\oplus C\oplus 0$. Now, $$\xi \in \left(\frac{D}{2}+k_2\right)$$

yielding the following form for the modulation matrix at $\xi$.

$$\begin{pmatrix} 0 & 0 & 0 & 0 & 0 \\ 0 & 1 & 0 & 0 & 0 \\ 1 & 0 & 0 & 0 & 0 \\ 0 & 0 & 0 & 0 & 0 \end{pmatrix}$$

It is now easy to verify that $C_i$, where i=1, 2, 3, 4, are the sets depicted in FIGS. 3, 4, 5 and 6, respectively. Let us now briefly review the case $$A = \begin{pmatrix} 1 & 1 \\ -1 & 1 \end{pmatrix}$$

In this case, p=|detA|=2. It is also not hard to verify $k_1=(\frac{1}{2},\frac{1}{2})$ and $$\tilde{P}(\xi) = \begin{pmatrix} \chi_D(\xi) & 0 \\ 0 & \chi_{D+k_1}(\xi) \end{pmatrix}$$

Thus, $D+k_1$ is now the union of the four quarter disks with radii ½ centered at the vertices of the fundamental domain $T^2$.

Figure 7A:
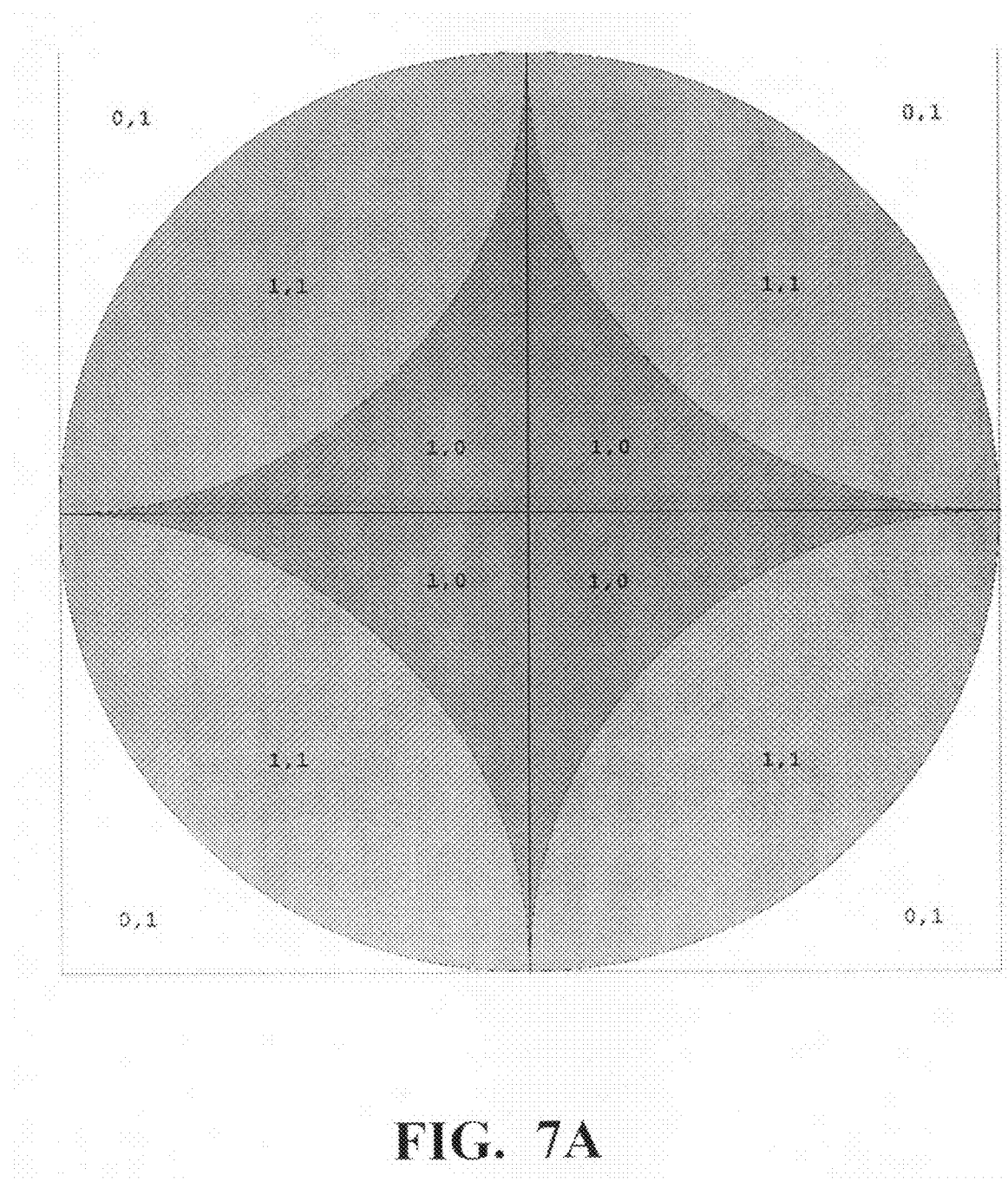
FIG. 7(a) depicts that each $C_i$ overlaps D.
Figure 7B:
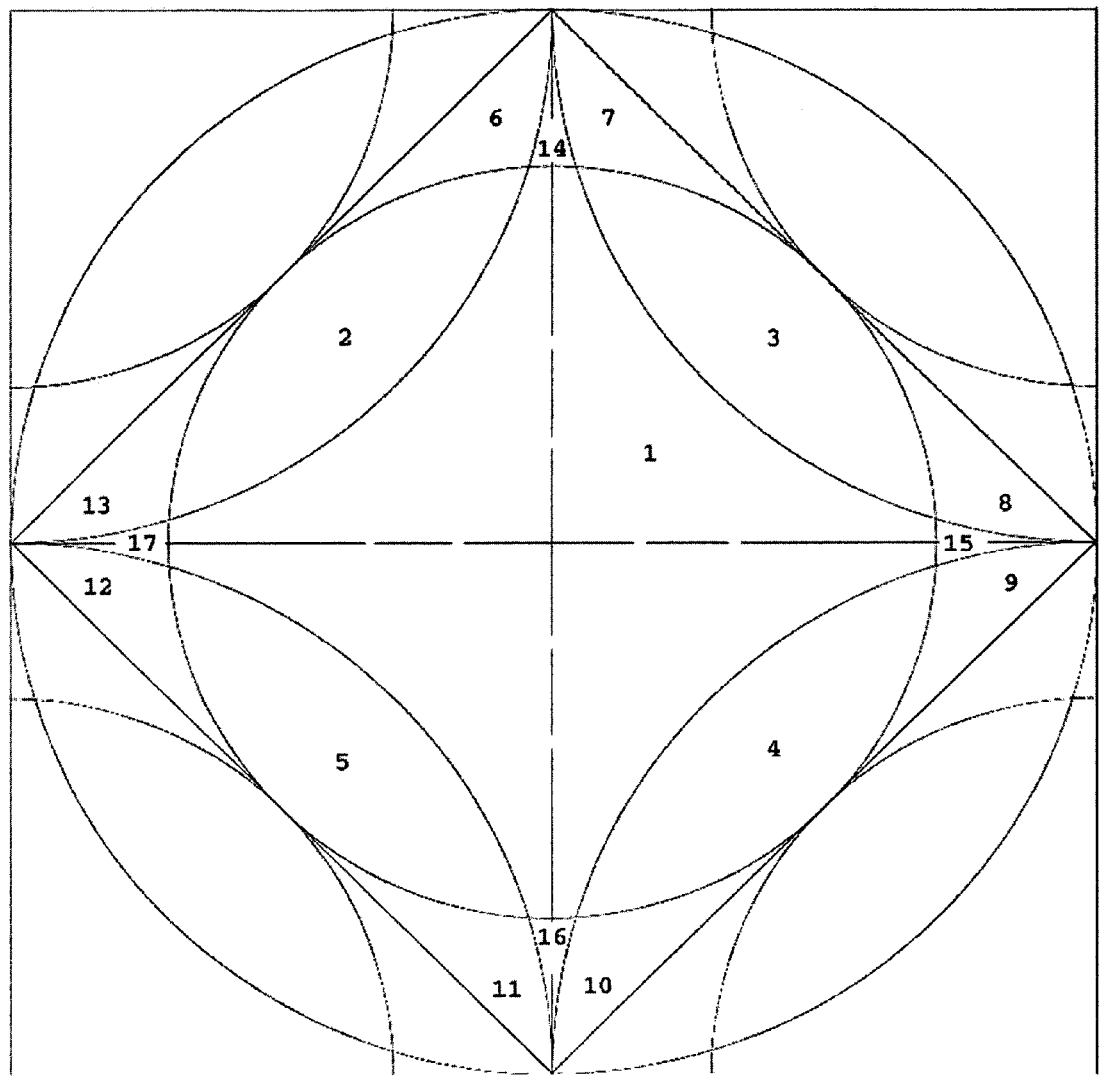
FIG. 7(b) depicts all point in $T^2$ at which the vector of the entries of the main diagonal.

Each disk overlaps with D as shown in FIG. 7(a). This overlapping, as in the case of $A=2I^2$, yields a partition of $T^2$, namely the collection of subsets $B_{(\in_0,\in_1)}$ where, $(\in_0,\in_1)$ is the vector of the entries of the main diagonal of an arbitrary value of $\tilde{P}$, and $B_{(\in_0,\in_1)}$ contains all points in $T^2$ at which the vector of the entries of the main diagonal of $\tilde{P}$ is equal to $(\in_0,\in_1)$ as shown in FIG. 7(b). The low pass filter is now given by $$m_0(\xi)=\sqrt{2}\chi_{D/\sqrt{2}}(\xi), \xi \in T^2$$

as shown in equation (6)). This expression of the low pass filter follows from the form of the dilation matrix which is a composition of a rotation by $\pi/4$ matrix and $\sqrt{2}I_2$. We can now take $$\tilde{H}(\xi)=\sqrt{2}(\tilde{h}_1(\xi),\tilde{h}_2(\xi))$$

for every $\xi \in T^2$. The modulation matrix now has a much simpler form, namely $$\begin{pmatrix} \chi_{\frac{D}{\sqrt{2}}}(\xi) & \tilde{h}_1(\xi) & \tilde{h}_2(\xi) \\ \chi_{\frac{D}{\sqrt{2}}}(\xi) & \tilde{h}_1(\xi+k_1) & \tilde{h}_2(\xi+k_1) \end{pmatrix} \text{ a.e. in } T^2$$

Figure 6:
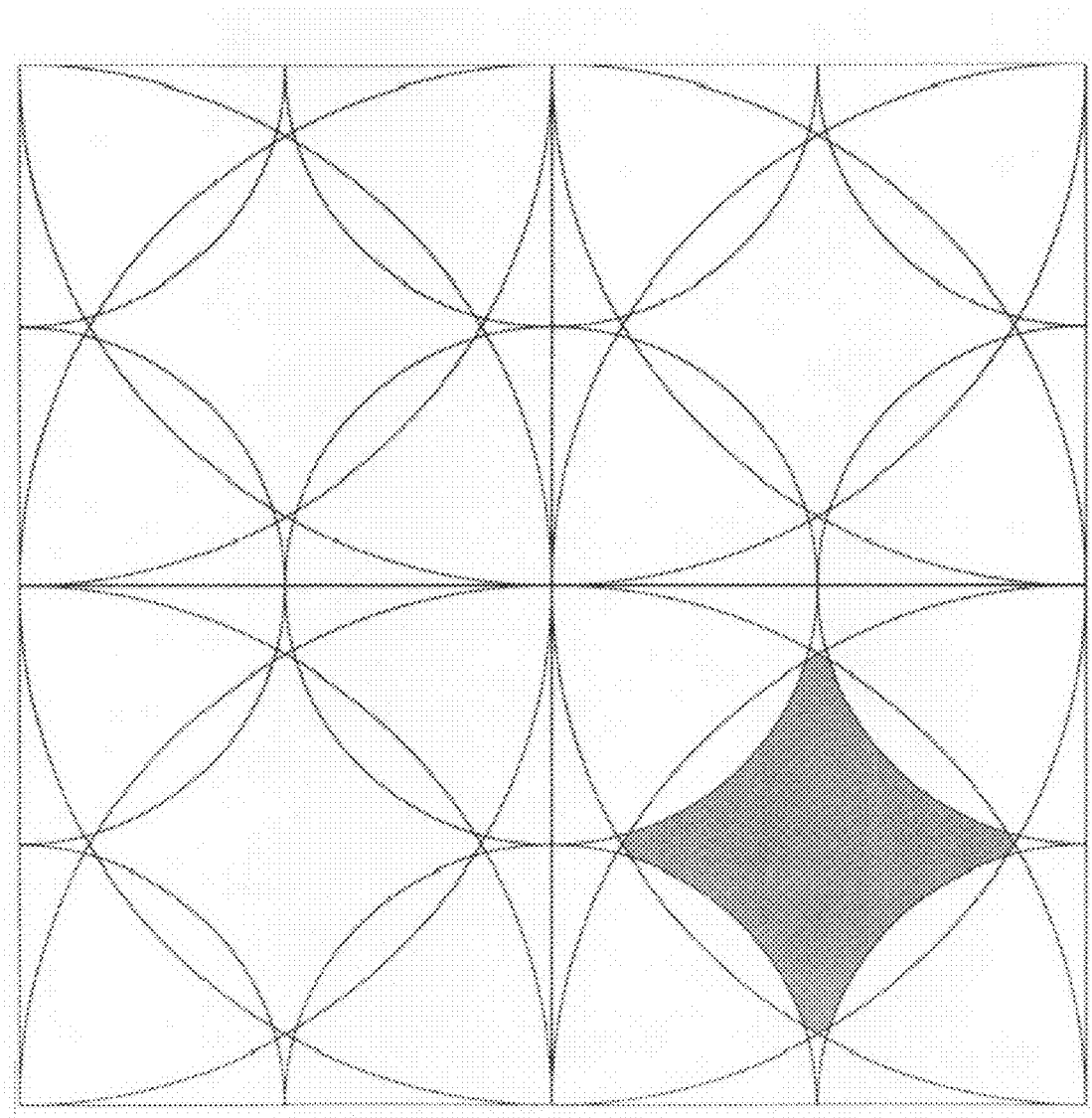

Let us now set Q to be the closed square whose vertices are the mid points of the sides of $T^2$. It is not hard to see that $Q+k_1$ is the union of the four orthogonal isosceles triangles defined by the vertices of Q and $T^2$. Obviously, $\{Q, Q+k_1\}$ is a partition of $T^2$ modulo null sets. An argument similar to the one in remark 3 shows that it is enough to determine the filters $\tilde{h}_i(i=1,2)$ only on Q. It will also be helpful to observe that the sides of Q are tangent to the circle of radius $$\frac{\sqrt{2}}{2}$$

centered at the origin and that Q can also be partitioned by the sets $Q\cap B_{(\in_0,\in_1)}$, where $(\in_0,\in_1)=(1,0), (1,1)$ as shown in FIG. 7(b). Each of these two sets will also be partitioned by its intersections with each one of $$\frac{D}{\sqrt{2}}, \frac{D}{\sqrt{2}}+k_1$$

and the complement of the union of the latter pair of sets as shown in FIG. 6. This, now results in a partition of Q into 17 sets.

Figure 8A:
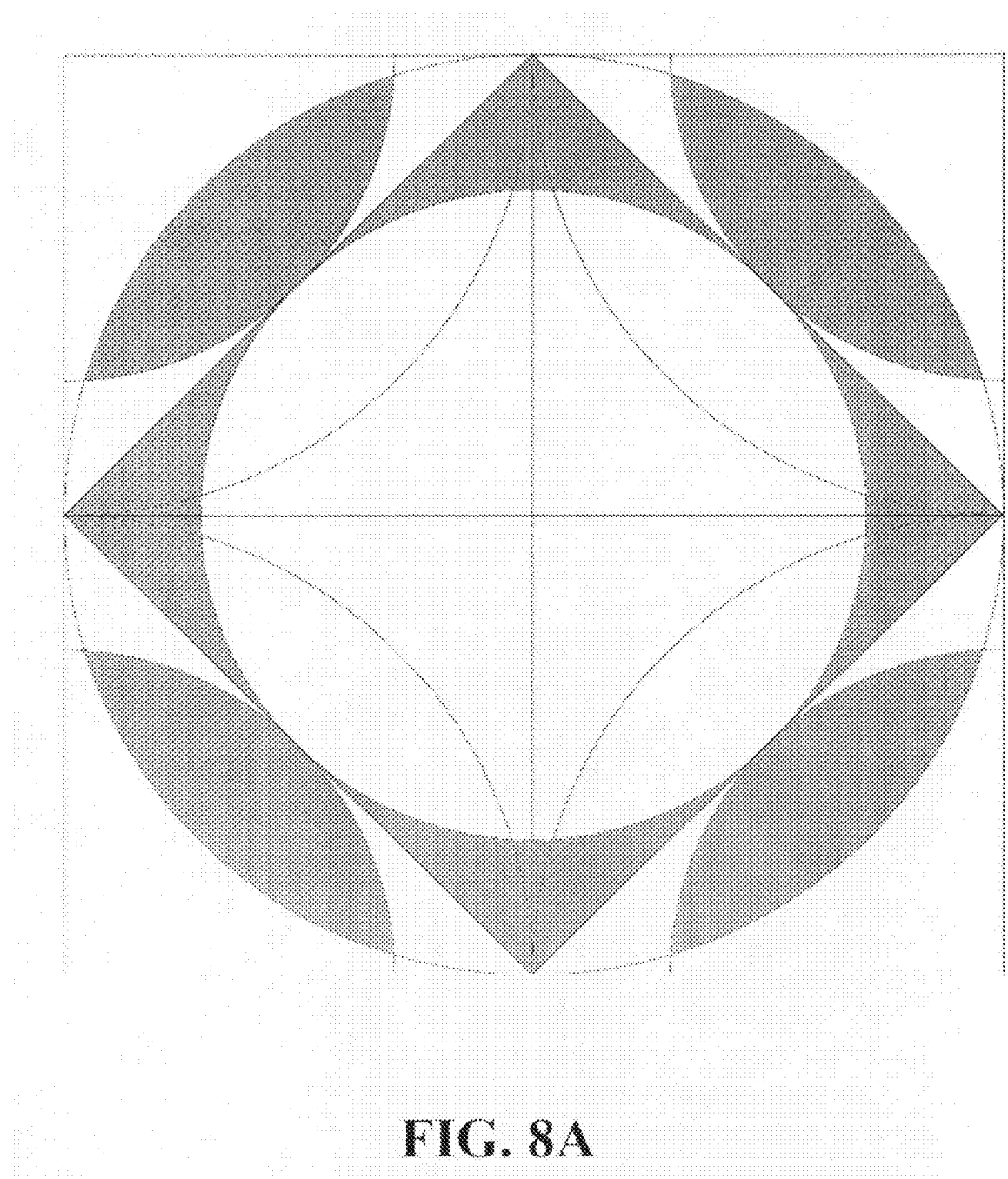
FIGS. 8(a) and (b) depict sets $C_1$ and $C_2$.
Figure 8B:
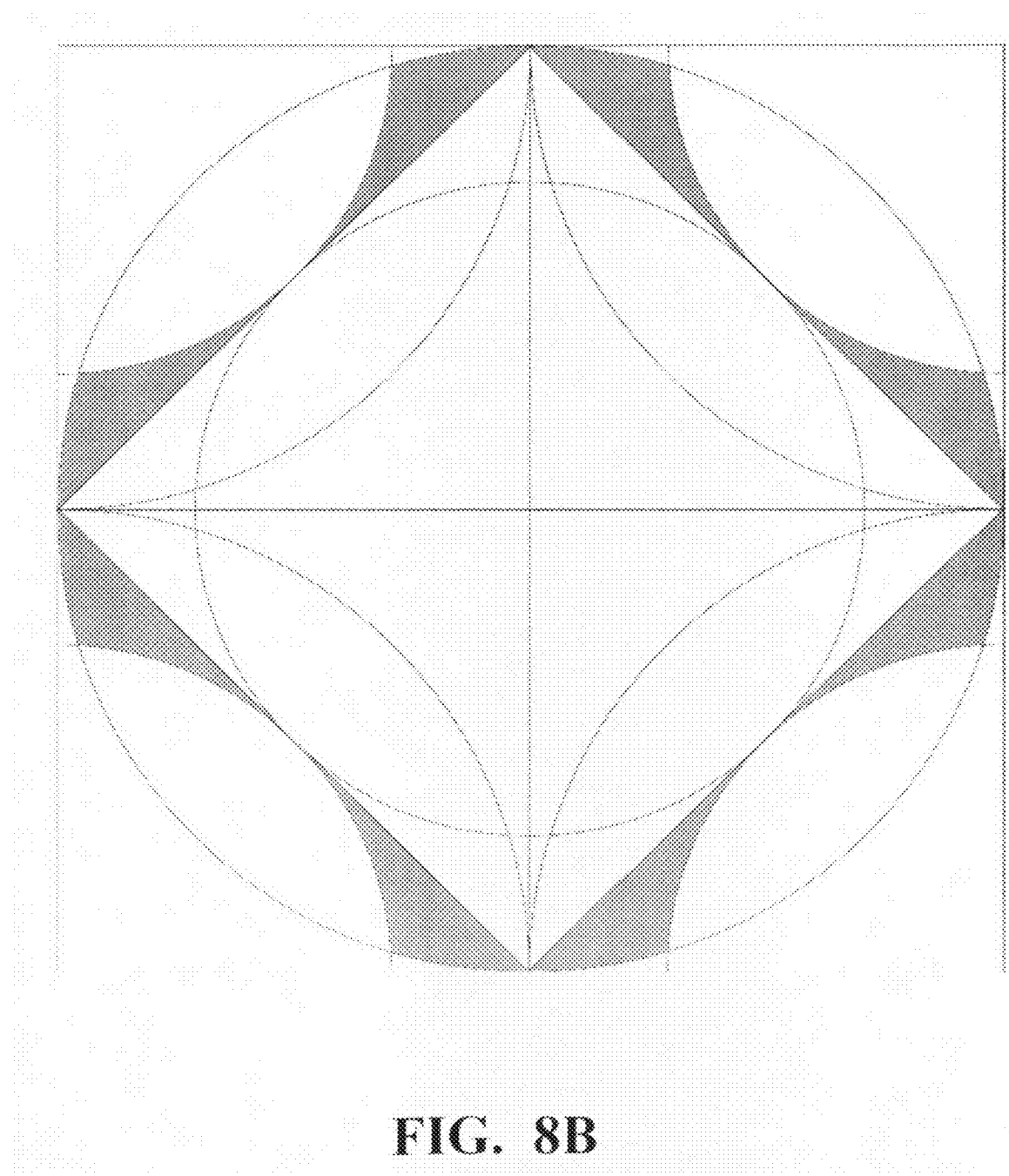

Arguing as in the case of $A=2I^2$, we can now obtain the sets $C_1$ and $C_2$, so that $\tilde{h}_i(\xi)=\chi_{C_i}(\xi)$, where $\xi \in T^2$ and i=1, 2 as shown FIGS. 8(a) and 8(b), respectively.

All references cited herein are incorporated herein by reference for all purposes allowed by law. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim

1. A method for frame multi-resolution analysis implemented on a computer comprising the steps of:
   using the computer to perform steps comprising:
   constructing isotropic, non-separable ideal windows in a dimension greater than 1;
   translating and dilating the ideal windows using translation and dilation operators;
   constructing isotropic, non-separable filters from the ideal windows of the previous step, where the filters are selected from the group consisting of isotropic, non-separable low pass filters, isotropic, non-separable high pass filters and isotropic, non-separable filters that cover a desired frequency range or plurality of desired frequency ranges;
   constructing isotropic, non-separable frame scaling functions; and
   producing associated isotropic, non-separable wavelets from the isotropic, non-separable filters and the isotropic, non-separable scaling functions, where the wavelets and filters filter and resolve or decompose multidimensional signals, data, information, or images into a plurality of non-overlapping sub-bands derived from the signals, data, information or images and corresponding to resolution levels improving analysis efficiency and improving analysis of more complex multidimensional signals, data, information or images.

2. The method of claim 1, further comprising the step of:
dividing each filter into at least one relative low pass component and at least one relative high pass component.

3. The method of claim 1, wherein the multidimensional signal is: a streaming video signal, a seismic imaging signal, a digital medical imaging signal, a satellite imaging signal, a surveillance imaging signal, a target acquisition imaging signal, a radar imaging signal, or a sonar imaging signal.

4. The method of claim 1, wherein the completely isotropic, intrinsically non-separable low pass filter or high pass filters are derived from
isotropic, non-separable ideal windows in a dimension greater than or equal to 1, and
translation and dilation operators adapted to form out of the ideal windows completely isotropic, non-separable low pass filters, isotropic, non-separable high pass filters and isotropic, non-separable filters that cover a desired frequency range or plurality of frequency ranges from the isotropic ideal filters.

5. The method of claim 4, wherein the isotropic, non-separable low pass filter comprises a mathematical construct given by:

$$m_0(\xi) = \sqrt{2}\chi_{D/\sqrt{2}}(\xi), \xi \in T^2.$$

6. The method of claim 1, wherein the completely isotropic, intrinsically non-separable scaling function comprises a mathematical construct given by:

$$\varphi = F^{-1}(\chi_D).$$

7. The method of claim 1, wherein the isotropic, non-separable wavelet scaling function comprises a mathematical construct given by:

$$\phi(R) = \frac{J_{n/2}(\pi R)}{(2R)^{n/2}}, \quad R > 0.$$

8. The method of claim 1, wherein the isotropic, non-separable wavelets are derived from
at least one isotropic, non-separable filter including at least one isotropic, non-separable ideal window and translation and dilation operators, where the filters are selected from the group consisting of isotropic, non-separable low pass filters, isotropic, non-separable high pass filters and isotropic, non-separable filters that cover a desired frequency range or plurality of frequency ranges; and
isotropic frame scaling functions, where translations of the frame scaling functions form a frame.

9. The method of claim 1, wherein the wavelet comprises a mathematical construct given by:

$$h_r = e_{q_r}\chi_Q\ r \in \{0, 1, \ldots, p-1\}$$

where $\{e_{A(k)}h_r : k \in Z^n, r=0, 1, \ldots, p-1\}$ is $\hat{W}_{-1}$ Parseval frame $\{T_{A(k)}F^{-1}h_r : k \in Z^n, r=0, 1, \ldots, p-1\}$ is a Parseval frame for $W_{-1}$, $\psi_r = D\, \mathcal{U}^{-1}\{T_k\psi_r : k \in Z^n, r=0, 1, \ldots, p-1\}$ is a Parseval frame for $W_0$, and $\{\psi_r : r=0, 1, \ldots, p-1\}$ is a Parseval frame multiwavelet set associated with the FMRA $\{V_j\}_j$.

10. The method of claim 1, further comprising the step of:
decomposing a multidimensional signal, data set, information, or image into the plurality of non-overlapping sub-bands or resolution levels using a plurality of isotropic, non-separable wavelets derived from the isotropic, non-separable filters and the isotropic, non-separable scaling functions.

11. The method of claim 10, further comprising the step of:
forming a reconstructed multidimensional signal, data set, information, or image from the plurality of non-overlapping sub-bands or resolution levels, where the reconstructed multidimensional signal, data set, information, or image has enhanced boundary properties and has reduced noise.

12. The method of claim 1, wherein the number of dimensions is greater than or equal to 2.

13. The method of claim 1, wherein the number of dimensions is greater than or equal to 3.

14. A method for analyzing data implemented on a computer comprising the steps of:
using the computer to perform steps comprising:
constructing at least one isotropic, non-separable wavelet including:
isotropic, non-separable filters having at least one ideal isotropic, non-separable window translated and dilated as necessary using translation and dilation operators, where the filters are selected from the group consisting of isotropic, non-separable low pass filters, isotropic, non-separable high pass filters and isotropic, non-separable filters that cover a desired frequency range or plurality of desired frequency ranges; isotropic frame scaling functions, where translations of the frame scaling functions form a frame; and
resolving or decomposing multidimensional signals, data, information, or images into a plurality of non-overlapping sub-bands corresponding to resolution levels, where the at least one isotropic, non-separable wavelet improves analysis efficiency and improves analysis of more complex multidimensional signals, data, information or images.

15. The method of claim 14, further comprising the step of:
dividing each isotropic, non-separable filter into at least one relative low pass isotropic, non-separable component and at least one relative high pass isotropic, non-separable component.

16. The method of claim 14, wherein the multidimensional signal is: a streaming video signal, a seismic imaging signal, a digital medical imaging signal, a satellite imaging signal, a surveillance imaging signal, a target acquisition imaging signal, a radar imaging signal, a sonar imaging signal, or a pattern recognition imaging signal.

17. The method of claim 14, wherein the number of dimensions is greater than or equal to 2.

18. The method of claim 14, wherein the number of dimensions is greater than or equal to 3.

19. A system for processing signals implemented on a computer comprising:
a computer including a processing unit having encoded thereon a completely isotropic, non-separable ideal filter for frame multi-resolution analysis software including:
software encoding isotropic, non-separable wavelets adapted to resolve a multidimensional signal into a plurality of non-overlapping sub-bands or resolution levels, where the wavelets are derived from:
isotropic, non-separable ideal windows or filters in a dimension greater than 1,
isotropic, non-separable low pass filters, isotropic, non-separable high pass filters and isotropic, non-separable filters that cover a desired frequency range or plurality of frequency ranges; and
isotropic, non-separable frame scaling functions where translations of the frame scaling functions form a frame;

where at least one of the wavelets resolves or decomposes multidimensional signals, data, information, or images into the plurality of non-overlapping sub-bands or resolution levels and improves analysis efficiency and analysis of more complex multidimensional signals, data, information or images.

20. The system of claim 19, wherein each isotropic, non-separable high pass filter and each isotropic, non-separable low pass filter comprise:

at least one isotropic, non-separable relative low pass component and at least one isotropic, non-separable relative high pass component.

21. The system of claim 20, wherein each isotropic, non-separable relative high pass component and each isotropic, non-separable relative low pass component comprise:

at least one isotropic, non-separable relative low pass subcomponent and at least one isotropic, non-separable relative high pass subcomponent.

22. The system of claim 19, wherein each isotropic, non-separable high pass filter and each isotropic, non-separable low pass filter comprise:

a plurality of isotropic, non-separable high pass and isotropic, non-separable low pass components, each component including at least one isotropic, non-separable relative low pass subcomponent and at least one isotropic, non-separable relative high pass subcomponent.

23. The system of claim 19, wherein the number of dimensions is greater than or equal to 2.

24. The system of claim 19, wherein the number of dimensions is greater than or equal to 3.

* * * * *